(12) United States Patent
Nicholas

(10) Patent No.: US 12,475,153 B2
(45) Date of Patent: *Nov. 18, 2025

(54) SEARCH ASSISTANT METHOD USING COMPUTER VISION ANALYSIS AND ARTIFICIAL INTELLIGENCE

(71) Applicant: Cardinal Holdings LLC, Evanston, IL (US)

(72) Inventor: Frank C. Nicholas, Wilmette, IL (US)

(73) Assignee: CARDINAL HOLDINGS LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,501

(22) Filed: May 10, 2024

(65) Prior Publication Data

US 2024/0303260 A1 Sep. 12, 2024

Related U.S. Application Data

(63) Continuation of application No. 16/507,023, filed on Jul. 9, 2019, now Pat. No. 11,983,206.

(Continued)

(51) Int. Cl.
*G06F 16/33* (2025.01)
*G06F 16/21* (2019.01)
(Continued)

(52) U.S. Cl.
CPC ........ *G06F 16/3338* (2019.01); *G06F 16/374* (2019.01); *G06Q 50/184* (2013.01);
(Continued)

(58) Field of Classification Search
CPC ........ G06F 16/31; G06Q 10/06; G06Q 30/02; G06Q 50/184
(Continued)

(56) References Cited

U.S. PATENT DOCUMENTS 11,983,206 B1 * 5/2024 Nicholas .............. G06Q 50/184
2007/0220041 A1 * 9/2007 Van Luchene ......... G06Q 10/06
707/999.102

(Continued)

*Primary Examiner* — Farzad Kazeminezhad
(74) *Attorney, Agent, or Firm* — Douglas B Teaney; CARDINAL LAW GROUP

(57) ABSTRACT

A search assistant method, the method of searching for patent documents material to elements of a target patent document including: receiving the target patent document including the elements, the target patent document being machine-readable; selecting keywords from the elements; identifying synonyms corresponding to the keywords in a synonym database; forming the keywords and the identified synonyms into a search string; identifying patent documents in a patent database based on the search string; highlighting the keywords and the identified synonyms in the identified patent documents; ranking the identified patent documents based on relevance of the highlighted keywords and the highlighted identified synonyms in each of the identified patent documents to the search string; determining citations in at least one of the ranked identified patent documents for each of the highlighted keywords and the highlighted identified synonyms; and mapping the elements of the target patent document to the determined citations.

20 Claims, 16 Drawing Sheets

Related U.S. Application Data

(60) Provisional application No. 62/695,199, filed on Jul. 9, 2018.

(51) Int. Cl.
    *G06F 16/3332* (2025.01)
    *G06F 16/353* (2025.01)
    *G06F 16/36* (2019.01)
    *G06F 16/9535* (2019.01)
    *G06F 40/279* (2020.01)
    *G06Q 50/18* (2012.01)

(52) U.S. Cl.
    CPC .......... *G06F 16/211* (2019.01); *G06F 16/353* (2019.01); *G06F 16/9535* (2019.01); *G06F 40/279* (2020.01)

(58) Field of Classification Search
    USPC ............................ 707/70, 999.102; 705/310
    See application file for complete search history.

(56) References Cited

U.S. PATENT DOCUMENTS

| | | | | |
|---|---|---|---|---|
| 2013/0110710 A1* | 5/2013 | Milone | .................. | G06Q 30/02 705/310 |
| 2014/0324808 A1* | 10/2014 | Sandhu | .................. | G06F 16/31 707/706 |

\* cited by examiner

Fig. 4D

9: Administration

Synonym Approval Queue: ← 582

| Term | Synonym | Dictionary | Approve? |
|---|---|---|---|
| bezel | edge | Farm Equipment | Yes / No |
| drive | storage | Computers | Yes / No |

580 → Eliminate synonym approval queue (edit thesaurus is already completed)

Edit Thesaurus: ← 584
[Computers ▼] ← 585

| Term | Synonym | Delete? |
|---|---|---|
| drive | hard drive | Delete |
| screen | display | Delete |
| screen | window | Delete |
| input device | keyboard | Delete |

Term: [ ]  Synonym: [ ]  [Add Synonym]

Authorization: ← 586

| AD Name ID | Is User | Is Admin |
|---|---|---|
| firstname.lastname@cardinal-ip.com | ☐ | ☐ |
| another.user@cardinal-ip.com | ☐ | ☐ |

Fig. 4L

9: Administration

SEARCH ASSISTANT METHOD USING COMPUTER VISION ANALYSIS AND ARTIFICIAL INTELLIGENCE

CROSS-REFERENCE TO RELATED APPLICATIONS

This present application claims priority to and is a continuation of U.S. patent application Ser. No. 16/507,023, filed Jul. 9, 2019, which claims priority to U.S. Provisional Application No. Ser. 62/695,199, filed Jul. 9, 2018, the disclosures of which are hereby incorporated by reference in their entirety.

TECHNICAL FIELD

The technical field of this disclosure is machine-readable document search methods, particularly, search assistant methods.

BACKGROUND OF THE INVENTION

Patent searching has become increasingly important. Government entities review millions of patent applications to determine whether the inventor is entitled to a patent. Corporations review issued patents to determine if new technological areas are available for development. Attorneys review patent art to decide whether patent infringement has occurred. The drastic decrease in the price of digital storage has greatly increased the size of databases including issue patents, patent applications, technical publications, and the like, available for patent searching.

Unfortunately, human users are poorly equipped to take advantage of such massive databases. Records are often acquired from many different sources such that different nomenclature is used for equivalent elements or devices. Records may be grouped into classes which are overlapping or ill-defined. Since the size of the databases preclude record-by-record review by a human user, who is limited to a certain number of hours to conduct their search, it is necessary to use a machine-assisted search to find useful information. Such searches by class or keyword often return an unwieldy number of results and require the user to further narrow their search. An inexperienced user may narrow their search to a particular class, missing relevant records in another class of which they are unfamiliar or unaware. The user may also narrow their search for a particular term, unaware that a different term applies to the same situation.

One particular example of this problem occurs in searching for art related to patent applications. The searcher will typically pick keywords from the proposed patent claims and search for those words in the prior art (patents, published applications, nonpatent literature, and the like). This may result in thousands of citations, more than the searcher can reasonably review. The searcher will then narrow the search by a defined class or subclass to achieve a reviewable number of citations. Such narrowing allows the searcher to obtain relevant art and to complete his search but presents the problem that relevant art is typically screened out.

It would be desirable to have search assistant method that would overcome the above disadvantages.

SUMMARY OF THE INVENTION

One aspect of the invention provides a method of searching for patent documents material to elements of a target patent document including: receiving the target patent document including the elements, the target patent document being machine-readable; selecting keywords from the elements; identifying synonyms corresponding to the keywords in a synonym database; forming the keywords and the identified synonyms into a search string; identifying database patent documents in a patent database based on the search string; highlighting the keywords and the identified synonyms in the identified database patent documents; ranking the identified database patent documents based on relevance of the highlighted keywords and the highlighted identified synonyms in each of the identified database patent documents to the search string; determining citations in at least one of the ranked identified database patent documents for each of the highlighted keywords and the highlighted identified synonyms; and mapping the elements of the target patent document to the determined citations.

Another aspect of the invention provides a method of searching for patent documents material to a figure of a target patent document, the method including: receiving at least a portion of the figure of the target patent document, the target patent document being machine-readable; selecting a reference number associated with the portion; determining a keyword in the target patent document related to the reference number; identifying synonyms in a synonym database corresponding to the keyword; forming the keyword and the identified synonyms into a search string; identifying database patent documents in a patent database based on the search string; highlighting the keyword and the identified synonyms in the identified database patent documents; ranking the identified database patent documents based on relevance of the highlighted keyword and the highlighted identified synonyms; and determining citations in at least one of the ranked identified patent for each of the highlighted keywords and the highlighted identified synonyms.

Another aspect of the invention provides a method of searching for patent documents material to a figure of a target patent document, the method including: receiving at least a portion of the figure of the target patent document, the target patent document being machine-readable; identifying figures of database patent documents in a patent database based on the portion of the figure of the target patent document; ranking the identified figures based on relevance to the portion of the figure of the target patent document; determining a reference number in one of the ranked identified figures; determining text in the one of the database patent documents related to the reference number; highlighting the determined text; and determining citations in the one of the database patent documents for the highlighted determined text.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIGS. 4A-4L are exemplary diagrams for one embodiment of a search assistant method in accordance with the invention displayed on a graphical user interface.

DETAILED DESCRIPTION

Figure 1:
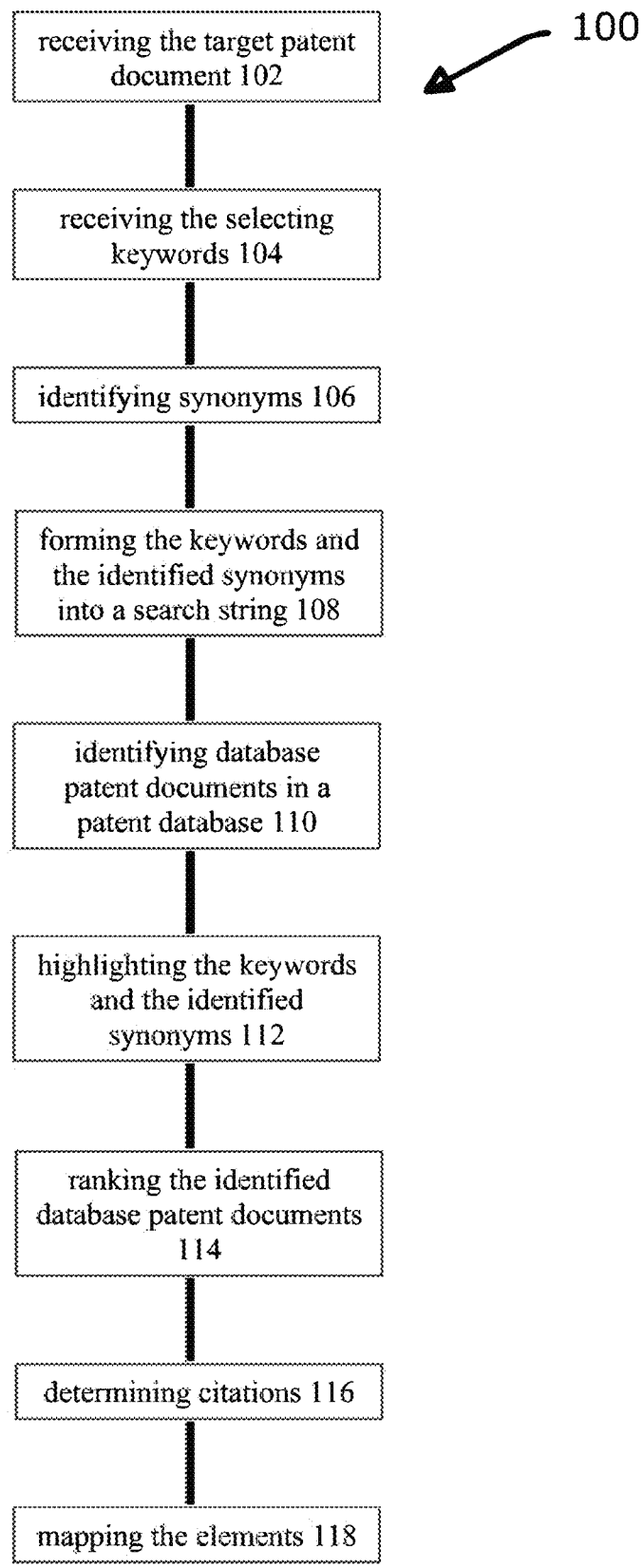
FIG. 1 is a block diagram of one embodiment of a search assistant method in accordance with the invention.

FIG. 1 is a block diagram of one embodiment of a search assistant method in accordance with the invention. In this embodiment, keywords and their synonyms related to elements of a target patent document are used to find document citations relevant to the elements of the target patent document.

Referring to FIG. 1, the method 100 of searching for patent documents material to elements of a target patent document can include: receiving the target patent document 102 including the elements, the target patent document being machine-readable; selecting keywords 104 from the elements; identifying synonyms 106 corresponding to the keywords in a synonym database; forming the keywords and the identified synonyms into a search string 108; identifying database patent documents in a patent database 110 based on the search string; highlighting the keywords and the identified synonyms 112 in the identified database patent documents; ranking the identified database patent documents 114 based on relevance of the highlighted keywords and the highlighted identified synonyms in each of the identified database patent documents to the search string; determining citations 116 in at least one of the ranked identified database patent documents for each of the highlighted keywords and the highlighted identified synonyms; and mapping the elements 118 of the target patent document to the determined citations.

The method 100 includes receiving the target patent document 102 including elements, the target patent document being machine-readable. The target patent document can be all or a part of a patent document, such as a published or unpublished US or foreign patent, claims, abstract, specification, invention disclosure, or the like. In the example of patent claims, the elements can be the preamble and elements setting out the limitation of the invention claimed. The patent claims can typically be parsed into the elements through the structure and punctuation of the patent claim, e.g., the claim preamble is at the beginning of the claim, followed by a linking word (such as "comprising"), a colon, and a number of elements setting out specific limitations, the number of elements being separated by commas or semicolons. The last of the number of elements is typically preceded by the word "and" and is followed by a period. Each of the elements can also begin with a capital letter in some cases. The search assistant method can use this structure and punctuation to divide a patent claim into patent claim elements. In one embodiment, the search assistant method can automatically parse the elements from the patent, application or invention disclosure. In another embodiment, the search assistant method can automatically parse the elements and a user viewing the results presented on a graphical user interface can review and amend the automatic parsing as desired. The target patent document is machine-readable, i.e., is in a format that can be easily processed by a computer.

The selecting keywords 104 from the elements can make use of the structure of the elements. In one example, the keywords can be nouns found within the elements. When the elements are part of a patent claim, the keywords can be identified as a noun preceded by the words "a" or "an" but not preceded by "the" or "said." this reduces the duplication of keywords in the identification.

The identifying synonyms 106 corresponding to the keywords in a synonym database expands the scope of the search to be performed by adding additional words to the search string. The synonym database can include general language synonyms or can include synonyms tailored for patent or technological usage. In one embodiment employed by a user, the method 100 can further include displaying a list of the identified synonyms to the user on a graphical user interface, and the user modifying the list on the graphical user interface prior to the forming the keywords and the identified synonyms into a search string 108. The method 100 can further include revising the synonym database to include alterations from modifying the list, so that the synonym database is constantly improved by user input. The databases may be a plurality of technology specific databases that are constantly improved by use of the search assistant based on modifications by the user and highlighted words or phrases that are used in claim mapping. The technical database can combine keywords and synonyms may be words or phrases. In one embodiment the database may include drawings or portions of drawings associated with key words and their synonyms. The databases may also be associated with one or more patent classification or subclass.

In one embodiment, the patent database is generated from a forward-and-backward citation search. The forward-and-backward citation search searches patents mentioned in or referencing the target patent document. In one embodiment, the forward-and-backward citation search can be performed on any reference selected by the user and the results provided in addition to the patents having key words/synonyms identified from the portion of a patent database that has been limited to one or more classifications. For example, a keyword search can be conducted on a particular classification of patents and published patent applications, one of the patents may be selected by the user and a forward and backward citation can be conducted and displayed as results. These forward and backward citation results may also highlight the key words/synonyms. In one embodiment, the Examiner office action or actions may be retrieved from the digital file history of the given patent application/patent to further identify the actual patent references cited by the Examiner during prosecution. These Examiner cited references can be ranked by type of rejection, Sections 102, 103.

The forming the keywords and the identified synonyms into a search string 108 forms a search string which is used in the identifying database patent documents in a patent database 110. The search string can incorporate logic operators such as used in a Boolean search as desired for a particular application. In one embodiment, the method 100 can further include determining one or more patent classifications associated with the target patent document, and adding the patent classification to the search string prior to the identifying database patent documents 110 to limit the highlighting and the ranking to particular patent classification, i.e., the search is narrowed to a particular patent classification.

The highlighting the keywords and the identified synonyms 112 in the identified database patent documents flags the keywords and the identified synonyms for use in the ranking the identified database patent documents 114 based on relevance to the search string of the highlighted keywords and the highlighted identified synonyms in each of the identified database patent documents. In one embodiment, the ranking can be weighted for particular keywords or synonyms, such as particular keywords or synonyms commonly found within a particular patent classification or technological area.

In one embodiment, once the claim elements are parsed, a color is assigned to each of the elements. The user can modify the parsed elements and the highlighting. The key words and their synonyms can also be assigned a color. When a search is run the patent documents identified in the results would include highlighting a portion of text that includes the keywords identified and the element identified. A mini legend can be provided with the color coding so that user can quickly move to the portion of the patent reference that has the element and key words. The search assistant can also receive instructions on which claim or claims to parse.

For example, the search assistant parses an independent claim and a second dependent claim. The independent claim is displayed with a preamble in a pink highlight, and a first element in a yellow highlight, and a second element in an orange highlight. The second claim is highlighted in a third element highlighted in light blue. The first element contains two key words of different colors, the second element has one of the first element keywords and a third different keyword. The third element has a fourth key word. All the keywords have a different color, as do the elements. The preamble may also include a keyword. The user can modify the elements. In this example the user can highlight the preamble and the first element all in Pink. So the claim know has three element colors, pink, orange, and light blue. The search assistant can be assigned a distance between words for each identified element. So the search string would be created, for example, preamble keyword within 10 of keyword 1 within 10 of keyword 2 And keyword 2 within 10 of keyword 3 And keyword 4. The results would then display the element groupings within the searched patent documents. The user may alternatively decide to amend the default word distance or turn it off and just search the key words without the elements. The element highlighting can for example be defaulted to display if the keywords that make up the element appear within a set number of words. The results may be ranked by elements found. Each located document can include a color coded mini lend so the user can quickly skip to each element and see each keyword and keywords when clustered together.

The highlighted portion containing the keywords may be modified by the user. The citation then the column and line of the highlighted element can be determined by locating the column number or paragraph number and estimating a line distance where the highlighting begins and end above and below the column number. If the highlighting is in two different columns, then at least a second column number is used as a reference and the beginning of the first highlight determination and the end of the second highlighted determination will form the citation. Once selected by a user the patent document and respect citations to each element can be mapped o the target patent claim elements.

In one embodiment employed by a user, the method 100 can further include displaying the highlighted keywords and the highlighted identified synonyms within the target patent document to the user on a graphic user interface and modifying at least one of the highlighted keywords and the highlighted identified synonyms by the user on the graphical user interface prior to the determining citations 116. This allows the user to amend the highlighted keywords and synonyms that appear in the citations.

The determining citations 116 in at least one of the ranked identified database patent documents for each of the highlighted keywords and the highlighted identified synonyms identifies where the keywords and synonyms appear in the individual database patent documents. In one embodiment of the method 100, the highlighting 112 further includes highlighting a portion of the target patent document adjacent to the keywords and the identified synonyms in the identified database patent documents; and the determining citations 116 further includes determining citations for the highlighted portion. This expands the focus of the determined citations.

The mapping the elements 118 of the target patent document to the determined citations provides a guide as to where each of the elements are to be found in the identified database patent documents. In one embodiment employed by a user, the method 100 can further include displaying the mapped elements with the determined citations to the user on a graphical user interface.

Those skilled in the art will appreciate that the method 100 of FIG. 1 can be modified to provide figure references related to the elements of a target patent document rather than citations to text. In this embodiment, the method for searching for database patent documents material to elements of a target patent document can include: receiving the target patent document including the elements, the target patent document being machine-readable; selecting keywords from the elements; identifying synonyms corresponding to the keywords in a synonym database; forming the keywords and the identified synonyms into a search string; identifying database patent documents in a patent database based on the search string; highlighting the keywords and the identified synonyms in the identified database patent documents; ranking the identified database patent documents based on relevance to the search string of the highlighted keywords and the highlighted identified synonyms in each of the identified database patent documents; determining figure references in at least one of the ranked identified database patent documents for each of the highlighted keywords and the highlighted identified synonyms; and mapping the elements of the target patent document to the figure references. The figure references can be one or more references to figures or portions of figures within the ranked identified database patent documents. In one embodiment employed by a user, the method can further include displaying the mapped elements with the figure references and/or figures to the user on a graphic user interface.

Figure 2:
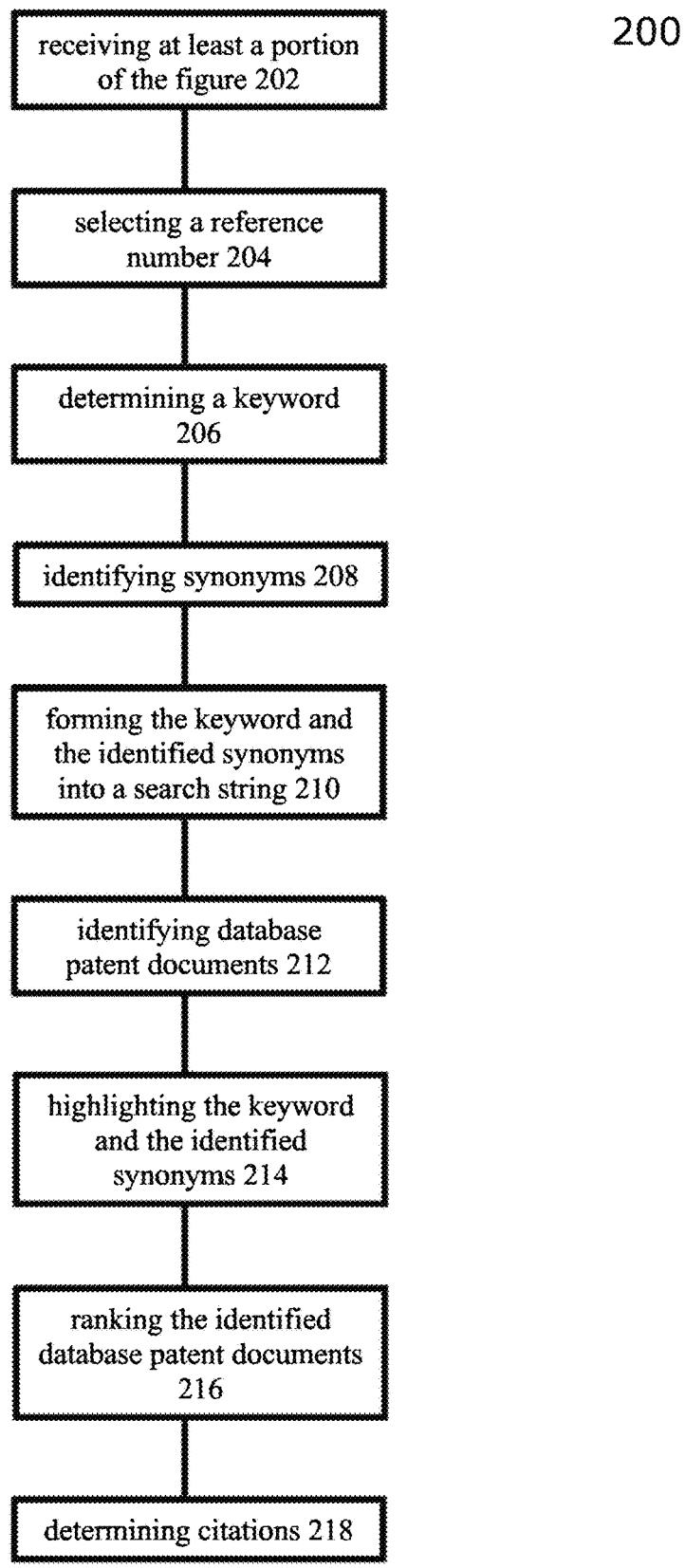
FIG. 2 is a block diagram of another embodiment of a search assistant method in accordance with the invention.

FIG. 2 is a block diagram of another embodiment of a search assistant method in accordance with the invention. In this embodiment, keywords and their synonyms related to a figure of a target patent document are used to find document citations relevant to the figure of the target patent document.

Referring to FIG. 2, the method 200 of searching for database patent documents material to a figure of a target patent document can include: receiving at least a portion of the figure 202 of the target patent document, the target patent document being machine-readable; selecting a reference number 204 associated with the portion; determining a keyword 206 in the target patent document related to the reference number; identifying synonyms 208 in a synonym database corresponding to the keyword; forming the keyword and the identified synonyms into a search string 210; identifying database patent documents 212 in a patent database based on the search string; highlighting the keyword and the identified synonyms 214 in the identified database patent documents; ranking the identified database patent documents 216 based on relevance of the highlighted keyword and the highlighted identified synonyms; and determining citations 218 in at least one of the ranked identified patent for each of the highlighted keywords and the highlighted identified synonyms.

The method 200 includes receiving at least a portion of the figure 202 of the target patent document, the target patent document being machine-readable. The target patent document can be all or a part of a patent document including a figure, such as a published or unpublished US or foreign patent, or the like. The target patent document is machine-readable, i.e., is in a format that can be easily processed by a computer.

The selecting a reference number 204 associated with the portion can include selecting a reference number adjacent to the portion of the figure. The selecting a reference number 204 can make use of drawing conventions and requirements in making the selection, such as following a lead line from the portion of the figure to the reference number.

The determining a keyword 206 in the target patent document related to the reference number can also make use of patent drafting conventions and requirements. For example, the keyword can typically be found adjacent to the reference number specification and/or abstract of the target patent document.

The identifying synonyms 208 in a synonym database corresponding to the keyword expands the scope of the search to be performed by adding additional words to the search string. The synonym database can include general language synonyms or can include synonyms tailored for patent or technological usage. In one embodiment employed by a user, the method 200 can further include displaying a list of the identified synonyms to the user on a graphic user interface, and the user modifying the list on the graphic user interface prior to the forming the keywords and the identified synonyms into a search string 210. The method 200 can further include revising the synonym database to include alterations from modifying the list, so that the synonym database is constantly improved by user input. In one embodiment, the patent database is generated from a forward-and-backward citation search. The forward-and-backward citation search searches patents mentioned in or referencing the target patent document. In one embodiment, the forward-and-backward citation search can be performed on any reference selected by the user and the results added to the patent database for a particular classification within the patent database.

The forming the keyword and the identified synonyms into a search string 210 forms a search string which is used in the identifying database patent documents in a patent database 212. The search string can incorporate logic operators such as used in a Boolean search as desired for a particular application. In one embodiment, the method 200 can further include determining a patent classification associated with the target patent document, and adding the patent classification to the search string prior to the identifying database patent documents 212 to limit the highlighting and the ranking to particular patent classification, i.e., the search is narrowed to a particular patent classification.

The highlighting the keyword and the identified synonyms 214 in the identified database patent documents flags the keywords and the identified synonyms for use in the ranking the identified database patent documents 216 based on relevance to the search string of the highlighted keywords and the highlighted identified synonyms in each of the identified database patent documents. In one embodiment, the ranking can be weighted for particular keywords or synonyms, such as particular keywords or synonyms commonly found within a particular patent classification or technological area.

In one embodiment employed by a user, the method 200 can further include displaying the highlighted keywords and the highlighted identified synonyms within the target patent document to the user on a graphic user interface, and modifying at least one of the highlighted keywords and the highlighted identified synonyms by the user on the graphic user interface prior to the determining citations 218. This allows the user to amend the highlighted keywords and synonyms that appear in the citations.

The determining citations 218 in at least one of the ranked identified database patent documents for each of the highlighted keywords and the highlighted identified synonyms identifies where the keywords and synonyms appear in the individual database patent documents. In one embodiment of the method 200, the highlighting 214 further includes highlighting a portion of the target patent document adjacent to the keywords and the identified synonyms in the identified database patent documents; and the determining citations 218 further includes determining citations for the highlighted portion. This expands the focus of the determined citations. In one embodiment employed by a user, the method 200 can further include displaying the determined citations in the ranked identified database patent documents to the user on a graphic user interface.

Figure 3:
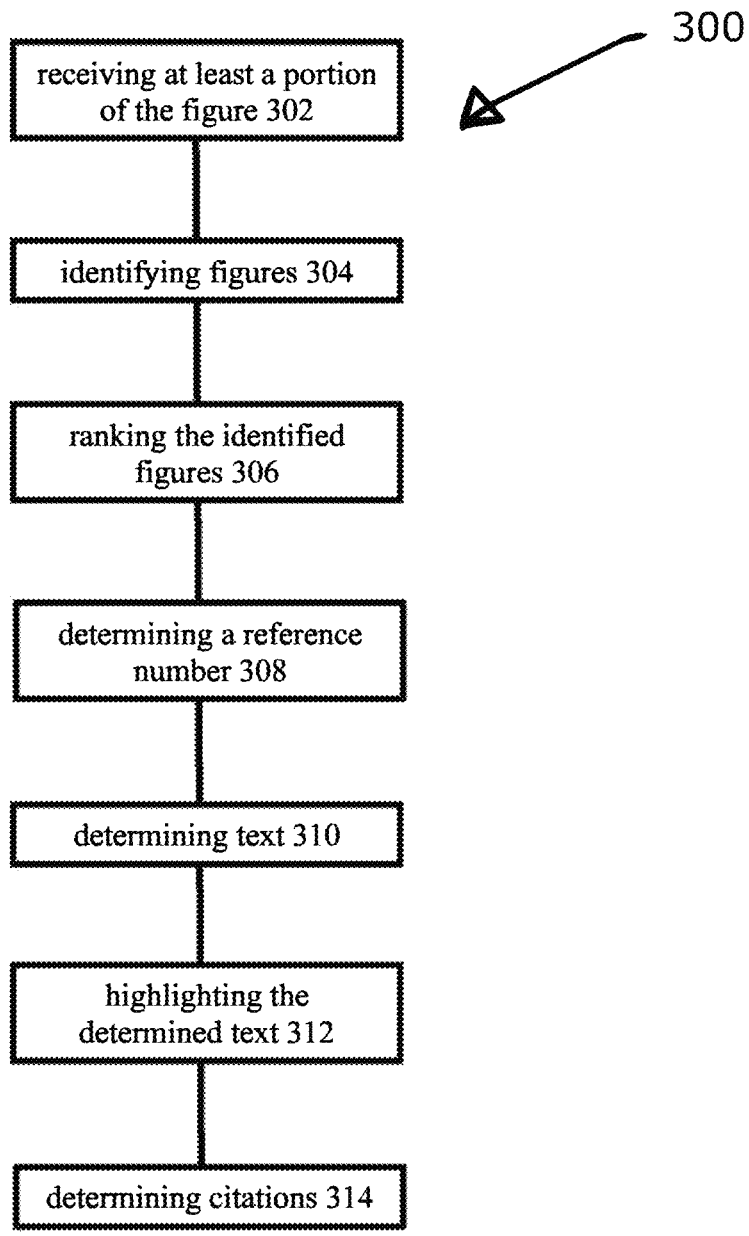
FIG. 3 is a block diagram of another embodiment of a search assistant method in accordance with the invention.

FIG. 3 is a block diagram of another embodiment of a search assistant method in accordance with the invention. In this embodiment, figures of patent documents similar to a figure of a target patent document are used to find patent document citations relevant to the figure of the target patent document.

Referring to FIG. 3, the method 300 of searching for patent documents material to a figure of a target patent document can include: receiving at least a portion of the figure 302 of the target patent document, the target patent document being machine-readable; identifying figures 304 of database patent documents in a patent database based on the portion of the figure of the target patent document; ranking the identified figures 306 based on relevance to the portion of the figure of the target patent document; determining a reference number 308 in one of the ranked identified figures; determining text 310 in the one of the database patent documents related to the reference number; highlighting the determined text 312; and determining citations 314 in the one of the database patent documents for the highlighted determined text.

The method 300 includes receiving at least a portion of the figure 302 of the target patent document, the target patent document being machine-readable. The target patent document can be all or a part of a patent document including a figure, such as a published or unpublished US or foreign patent, or the like. The target patent document is machine-readable, i.e., is in a format that can be easily processed by a computer.

The identifying figures 304 of database patent documents in a patent database based on the portion of the figure of the target patent document includes matching figures of the database patent documents to the portion of the figure. In one embodiment employed by a user, the method 300 can further include displaying a list of the identified figures to the user on a graphic user interface and modifying the list by the user on the graphic user interface prior to the ranking the identified figures 306. The patent database figures can also be re-indexed based on the modifications to the list by the user.

The method 300 can further include revising the patent database to include alterations from the modifying the list. In one embodiment, the method 300 can further include determining a patent classification associated with the target patent document and limiting the patent database to the patent classification prior to the identifying figures 304. In another embodiment, the patent database can be limited to only cross section drawings, i.e., cross-section slices of a device or apparatus. When a selected target figure that is a cross sectional view, search can be limited to only cross sectional tagged drawings of the patent documents.

In one embodiment, the patent database is generated from a forward-and-backward citation search. The forward-and-backward citation search searches patents mentioned in or referencing the target patent document. In one embodiment, the patent database is generated for a patent classification by conducting a computer vision analysis on the database patent documents within the patent classification. In one embodiment, the forward-and-backward citation search can be performed on any reference selected by the user and the results added to the patent database for a particular classification within the patent database.

The ranking the identified figures 306 based on relevance to the portion of the figure of the target patent document orders the identified figures. In one embodiment, the ranking can be weighted for particular features of the portion of the figure, such as particular features commonly found within a particular patent classification or technological area.

The determining a reference number 308 in one of the ranked identified figures can include selecting a reference number adjacent to the ranked identified figure. The determining a reference number 308 can make use of drawing conventions and requirements in making the determination, such as following a lead line to the reference number. In one embodiment, the reference number can be the figure number for the whole ranked identified figure, determinable from words appearing on the ranked identified figure such as FIG., FIGURE, or the like.

The determining text 310 in the one of the database patent documents related to the reference number can also make use of patent drafting conventions and requirements. For example, the text can typically be found adjacent to the reference number specification and/or abstract of the target patent document.

The highlighting the determined text 312 flags the determined text for use in the determining citations 314 in the one of the database patent documents for the highlighted determined text. In one embodiment employed by a user, the method 300 further includes displaying the highlighted determined text within the one of the database patent documents to the user on a graphic user interface and modifying the highlighted determined text by the user on the graphic user interface prior to the determining citations 314. In one embodiment of the method 300, the highlighting 312 further includes highlighting a portion of the target patent document adjacent to the determined text in the identified database patent documents and the determining citations further includes determining citations for the highlighted portion. In one embodiment employed by a user, the method 300 further includes displaying the determined citations in the ranked identified database patent documents to the user on a graphic user interface.

Those skilled in the art will appreciate that the search assistant method can learn and improve search results based on the selections by a user. In one embodiment, the databases can be modified anytime a user changes the automatically generated results, such as changes to synonyms, highlighting, or patent classification. The databases can be established initially through artificial intelligence analysis of patent data, such as reviewing US issued patents in a particular patent classification for synonyms of commonly occurring terms. Artificial intelligence analysis can also be used to review the selections by a user or number of users in and review how to make modifications to the databases. In one embodiment, artificial intelligence algorithms can simultaneously search all or a portion of a target patent document and provide patent documents that can be inserted in the ranked identified database patent documents (ranked references) based on, in one embodiment, also matching some keywords, or based on the AI algorithms relevance ranking. When a user selects a synonym from a patent document identified by artificial intelligence, the selected synonym can be added to the synonym database.

FIGS. 4A-4L are exemplary diagrams for one embodiment of a search assistant method in accordance with the invention displayed on a graphic user interface.

Figure 4A:
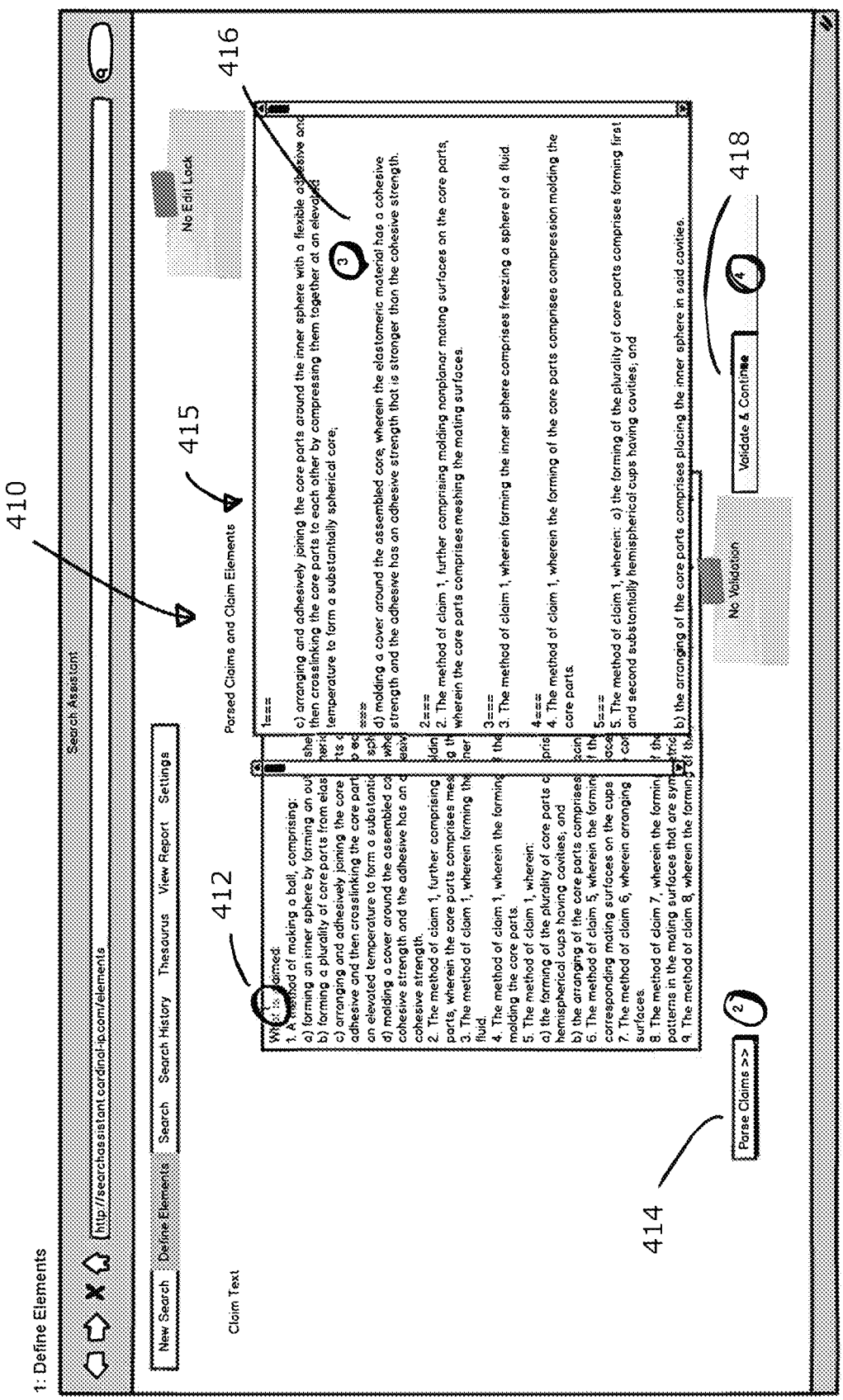

Referring to FIG. 4A, the Define Elements screen 410 allows the user to import claim text, ask the computer to automatically parse it into Claims and Claim Elements, review and adjust the results of the automatic parsing, and save the result. Claim text can be copied and pasted into the Claim Text box 412. When the "Parse Claim Text" button 414 is pressed, the text is sent to the server for analysis and results appear in the Element Definitions box 415.

In one example of claim text parsing, a claim can be deemed dependent if it contains the text string "claim" followed by whitespace followed by a decimal numeral, and independent otherwise. For independent claims, when an independent claim contains a semicolon, break at each colon or semicolon. Otherwise, break at each comma or wherein. If it does not contain any commas or 'wherein's, treat the claim as a single element. For dependent claims, when a dependent claim contains a colon or semicolon, break at each colon and semicolon. Otherwise, treat the claim as a single element.

A User can edit the claim and element definitions in the Element Definitions box 415 using a special markup 416. In one embodiment, the new claims are denoted by a line break and the markup "[number]===". In one embodiment, the new elements are denoted by a line break and the markup "===". The "Validate and Continue" button 418 checks to ensure the markup is valid, saves the element selections, and moves the user to the Define Search screen.

The Search function can be divided among multiple panels, such as the Define Search view, Keyword Editor view, and Search Results view.

Figure 4B:
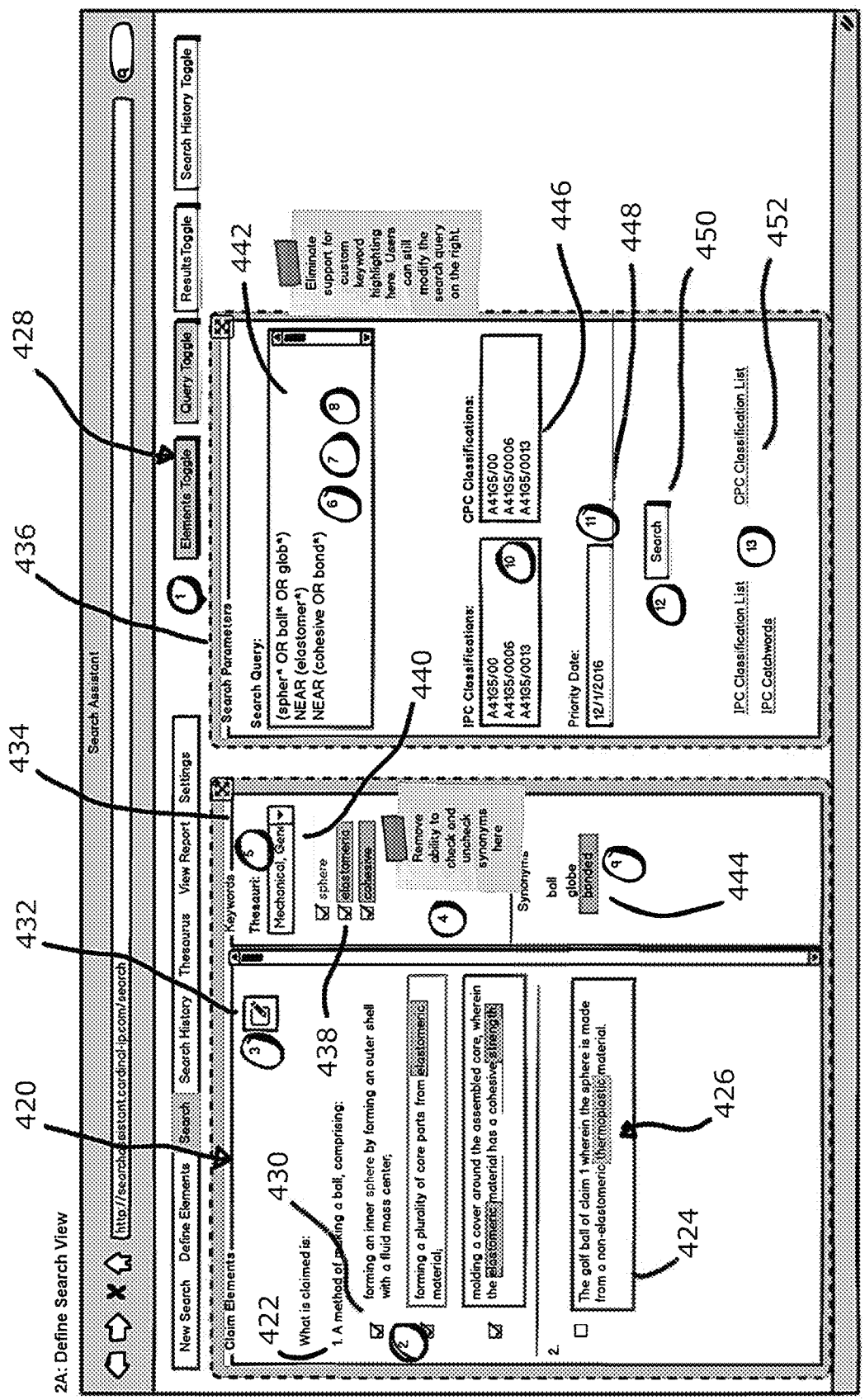

Referring to FIG. 4B, the Define Search view allows the user to specify parameters of a search: namely, a Keyword Phrase, IPC Classifications, CPC Classifications, and Priority Date. The Keyword Phrase can be automatically generated from the Keyword and Thesauri variables, defined directly by the user, or a combination of both.

Elements defined in the Define Elements screen 410 appear in a selectable list on the Claim Elements panel 420, broken down by claim 422 and then Claim Element 424. The Claim Elements panel 420 can highlight any system-identified keywords 426 in a set of pre-defined colors.

Any of the three Search panels can be toggled to be visible or invisible by the toggle buttons 428.

Users can select which elements 424 can be included in the search process. Selecting an element 424 can cause the element 424 to be outlined with a pre-assigned color. Element selection can be done by clicking the element 424 or checkbox 430. Color assignment can be a pre-determined set of colors—the first element selected can be orange, the next blue, etc. Deselecting an element can queue the next available color in the color sequence.

Clicking the Keyword Edit button 432 can launch the Keyword Editor.

Keywords, as highlighted in the Claim Elements panel 420, can appear in the Keywords panel 434 upon initial screen load and after closing the Keyword Editor. Keywords are selectable to include in the search via checkboxes 438. As keywords are selected or deselected, the Search Parameter panel 436 can be dynamically updated to add or remove the relevant Keyword Clause.

One or more thesauri can be selected in the Search Parameters panel 436. In one embodiment, the thesauri can be selected from a dropdown menu 440.

The Keyword Search String text box 442 is fully editable. The Keyword Search String text box 442 can also be responsive to two special operators: CTF [VALUE] and CTB [VALUE]. These operators can perform a 1-step forward or backward search on the specified reference patent number, respectively. These operators cannot be combined with any other operators or with each other. If the user edits the Keyword Search String text box 442 and submits a search directly afterwards, the server can attempt to parse any new synonyms from the edits and what keyword and thesaurus the edit was a part of. If the server determines a new synonym has been found, it can add the synonym to the "Synonym Approval Queue" as described for the Administration panel.

Synonyms 444, as determined by the Thesauri dropdown menu 440, can appear below the Keywords.

Classification restrictions may be set to narrow the search to only the classifications listed. Classifications 446 can be entered freehand and are not subject to validation.

Priority Date 448 can limit the search to documents on or after the date specified. If no Priority Date is specified, the set is unbounded by this field (all dates are searched).

Clicking Search 450 can cause the Search Results panel to appear. It can initiate a search on the server and log the search to the search.

Several useful links 452 can be provided at the bottom of the screen as desired for a particular application.

Figure 4C:
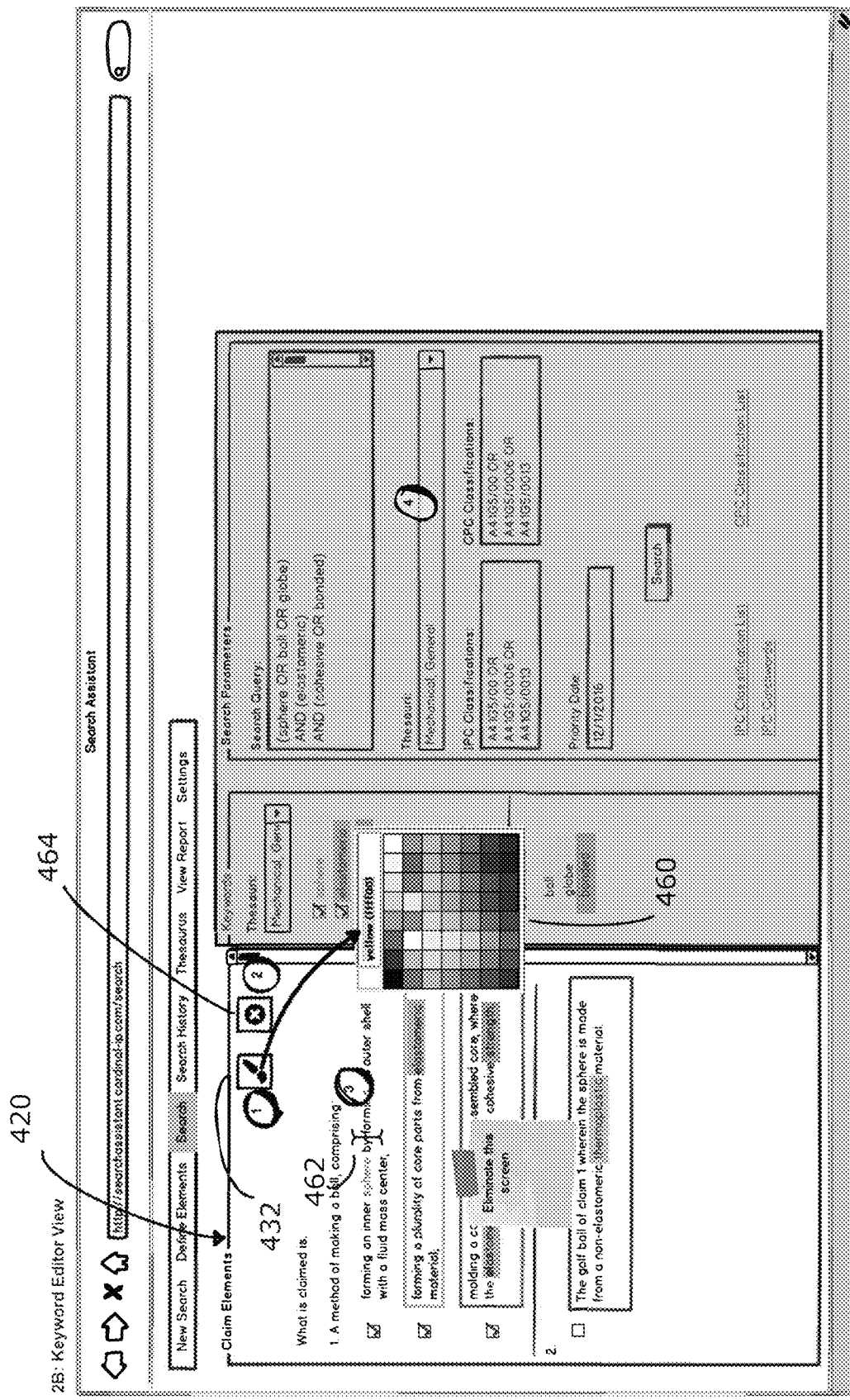

Referring to FIG. 4C, clicking the Keyword Editor button 432 launches the Keyword Editor Mode. In this mode, the text area for the claim elements becomes selectable, and a color picker icon 462 appears. The user can select keywords by highlighting words or phrases with various colors with the color picker icon 462.

Selecting this icon launches a color picker palette 460. The color picker palette 460 disappears upon selection of a color, and the Color Picker icon 462 changes to the selected color. One of the options in the color picker palette 460 will be an "un-highlight" option.

Clicking the Keyword Editor button again (which is now a "Close" icon 464) leaves the Keyword Editor Mode and returns to the Define Search screen. When this happens, the keywords in the "keywords" box update to reflect the new state reflecting the colors selected. The Search Parameters box and Synonyms box will also update.

Other sections of the screen, besides navigation, are disabled during the Keyword Editor mode.

Figure 4D:
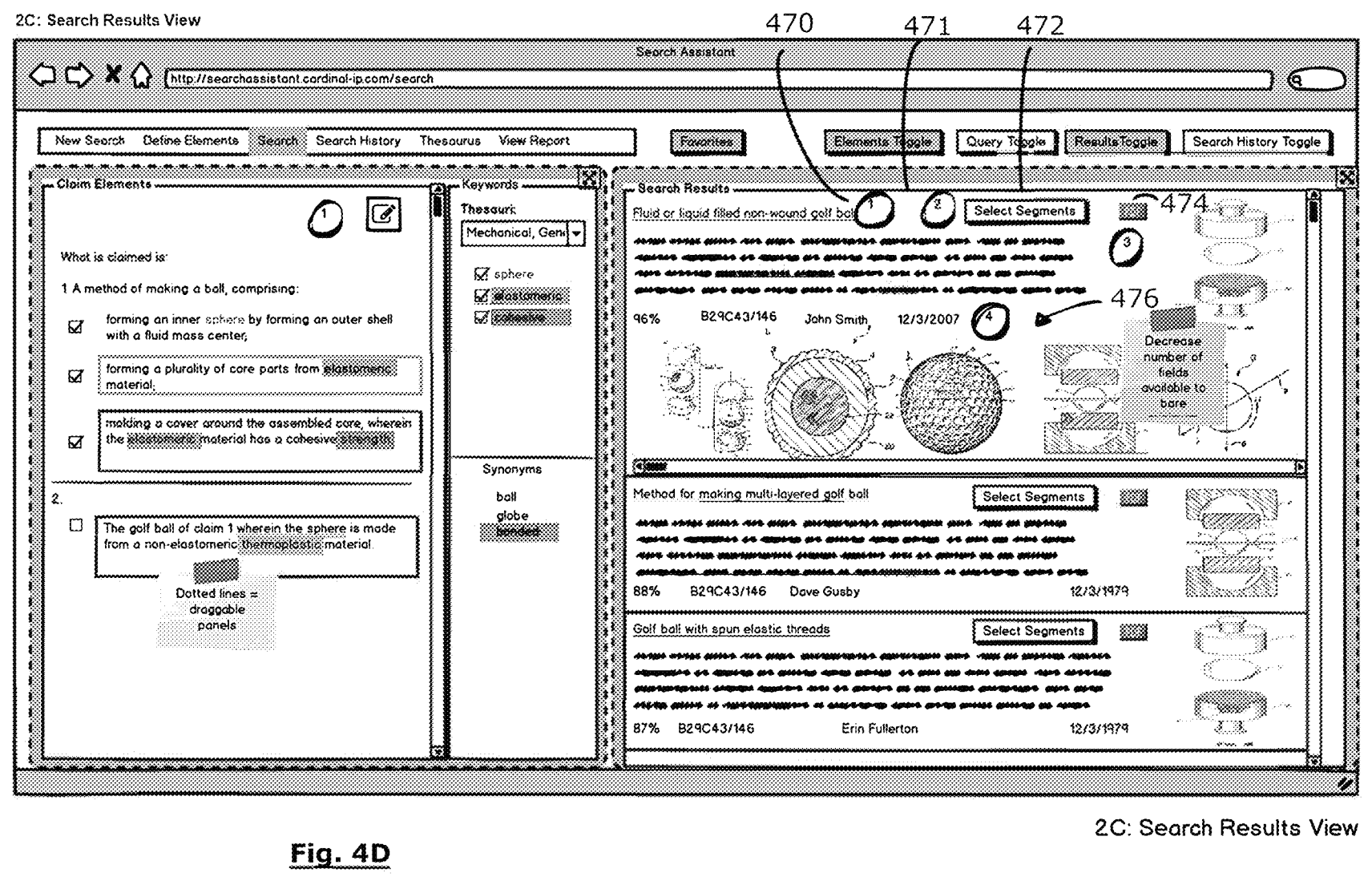

Referring to FIG. 4D, the Search Results View 471 can be opened inside of the Search page as a Panel, or in a new Chrome window (depending on the source of the link), so that many searches can be viewed, perused, and clicked on at one time.

The title 470 links to the "Reference Details" page. A button 472 launches the "Segment Selection" page. A PDF button 474 opens the PDF in a new browser window. A scrollable list 476 of images can appear for each of the search results. Each image can be clickable to pop over a larger version of the image.

Each search result can contain the following fields: Publication Number (Default); Title (Default); Abstract (Default); Publication Date (Default); Application Date; Priority Date; Inventor Name; Applicant Name; Classifications; First/Representative Drawing (Default); First Claim; and Representative Image. Fields that display can be configured via the "User Settings" page.

Figure 4E:
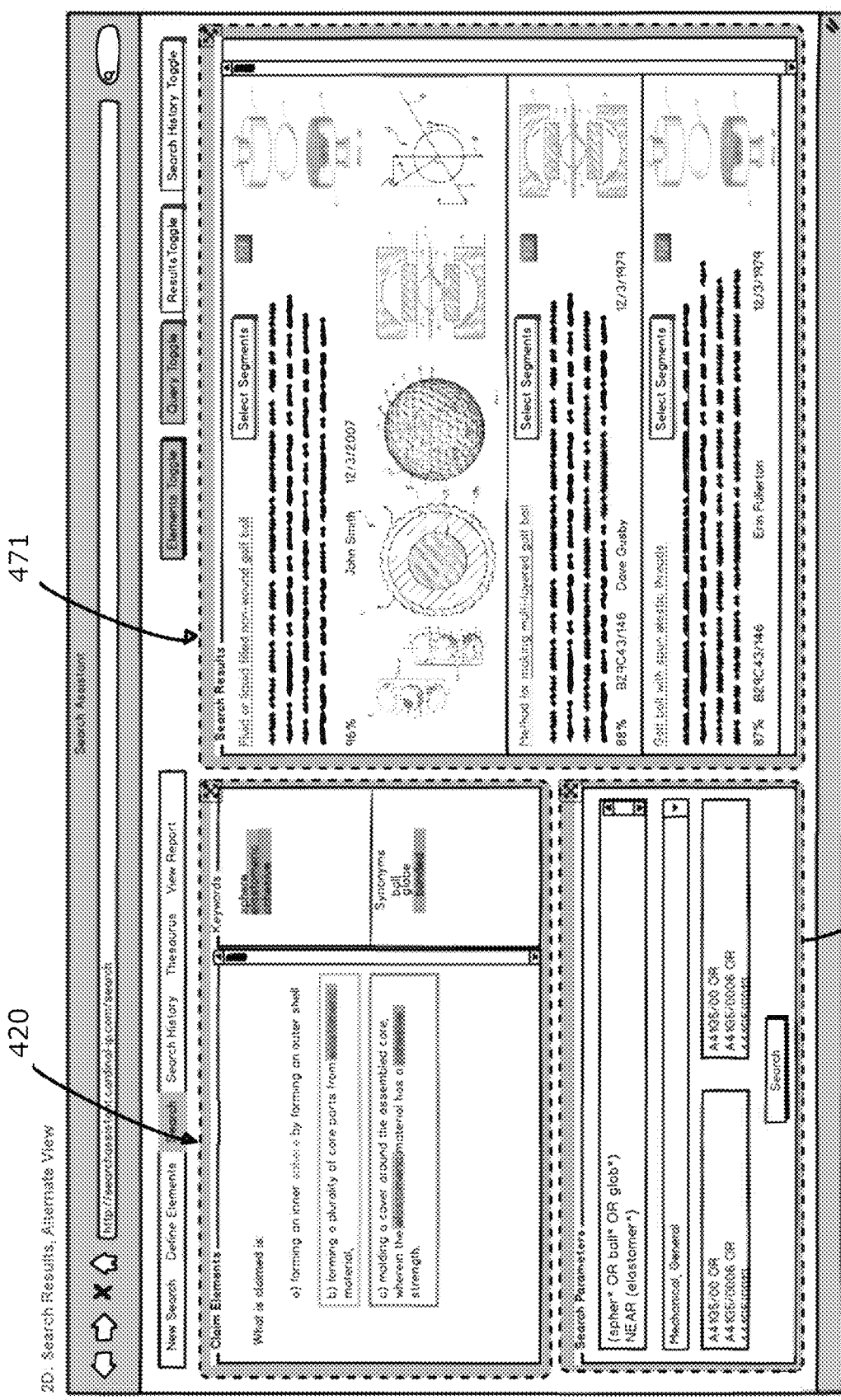

Referring to FIG. 4E, an alternate view of search function on the display provides the Claim Elements panel 420, the Search Results panel 471, and the Search Parameter panel 436.

Figure 4F:
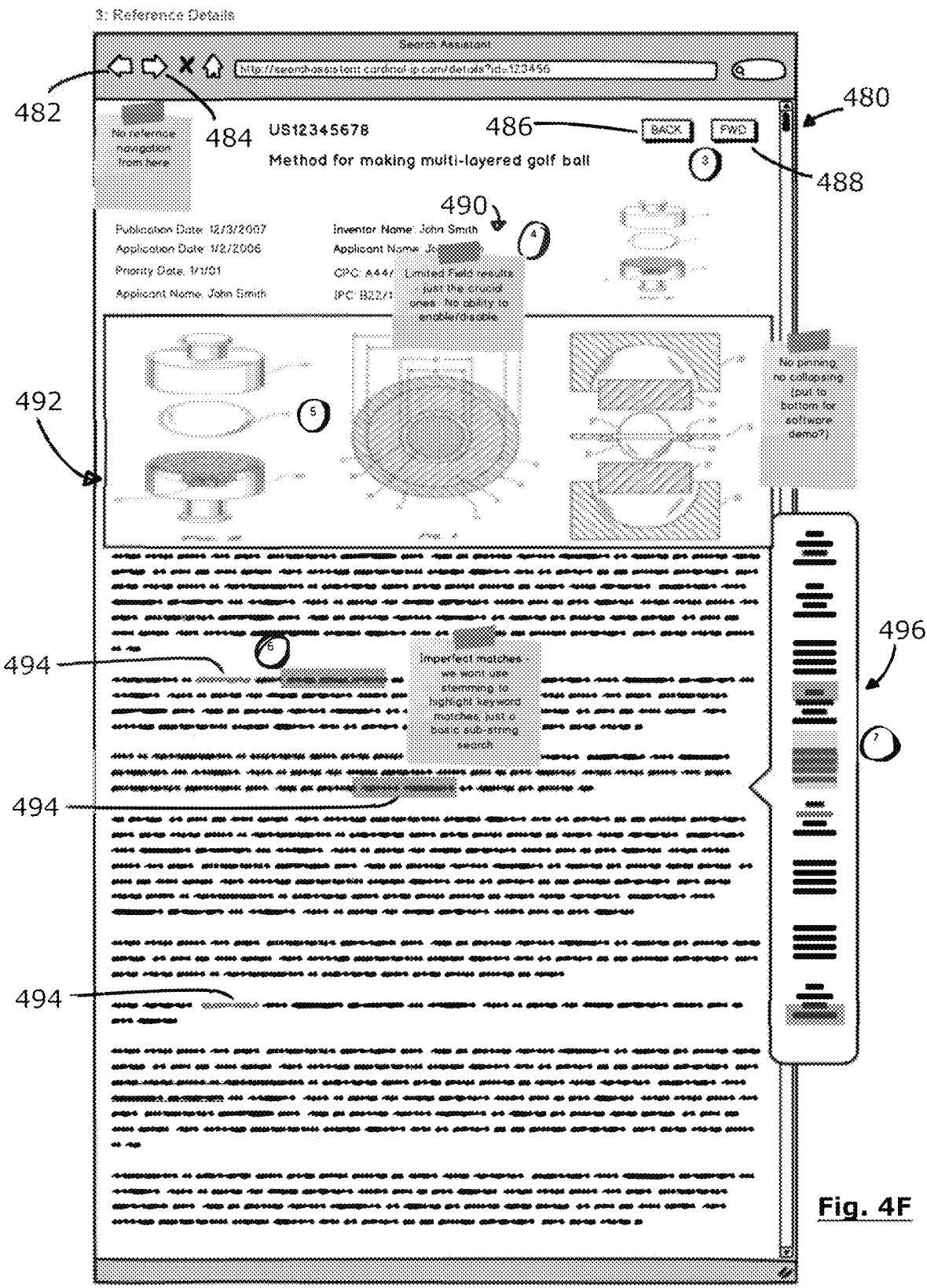

Referring to FIG. 4F, the reference details screen 480 provides a text-based details page. Fields can be configured to display via the "User Settings" page.

Clicking the Previous Record button 482 loads the previous reference as listed in in the results set and clicking the Next Record button 484 loads the next reference as listed in in the results set. The Forward Search button 486/Backward Search button 488 switches to the search screen and executes a one level forward or backward citation search in a new window.

Assorted fields 490 can display as follows: Publication Number (Default); Title (Default); Abstract (Default); Publication Date (Default); Application Date (Default); Priority Date (Default); Inventor Name (Default); Applicant Name (Default); Classifications; Representative image; Full-size images (collapsible); and Full text with keywords highlighted (default).

Full-size images 492 can be displayed, collapsed to remove from view, or disabled in the user settings to speed up loading.

Keywords 494 can be highlighted in color as specified in the Keywords box. A mini-map 496 can provides an overview of the text shape of the document, as well as the locations of keywords throughout the document, as the keywords are highlighted.

Figure 4G:
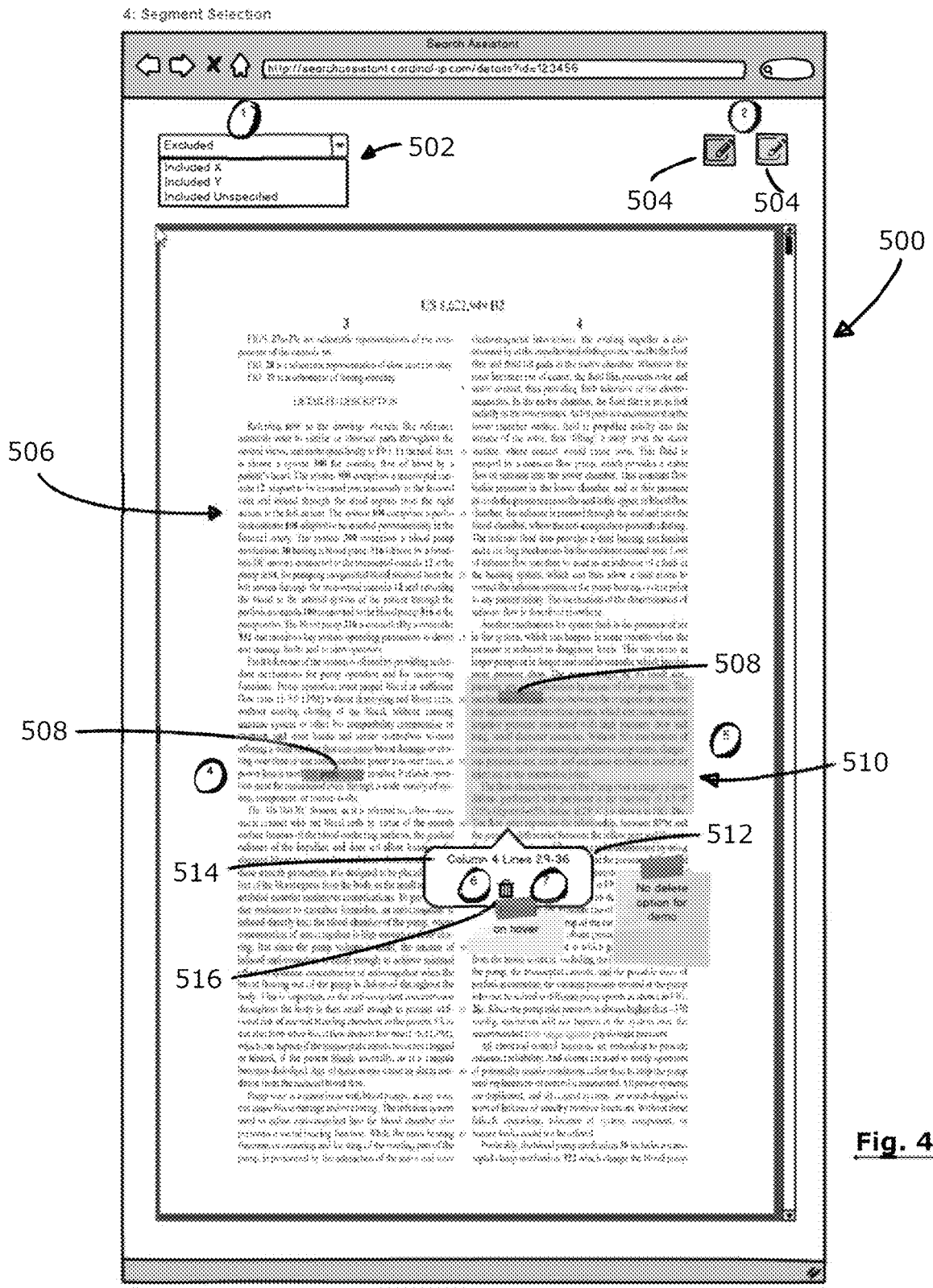
Figure 4H:
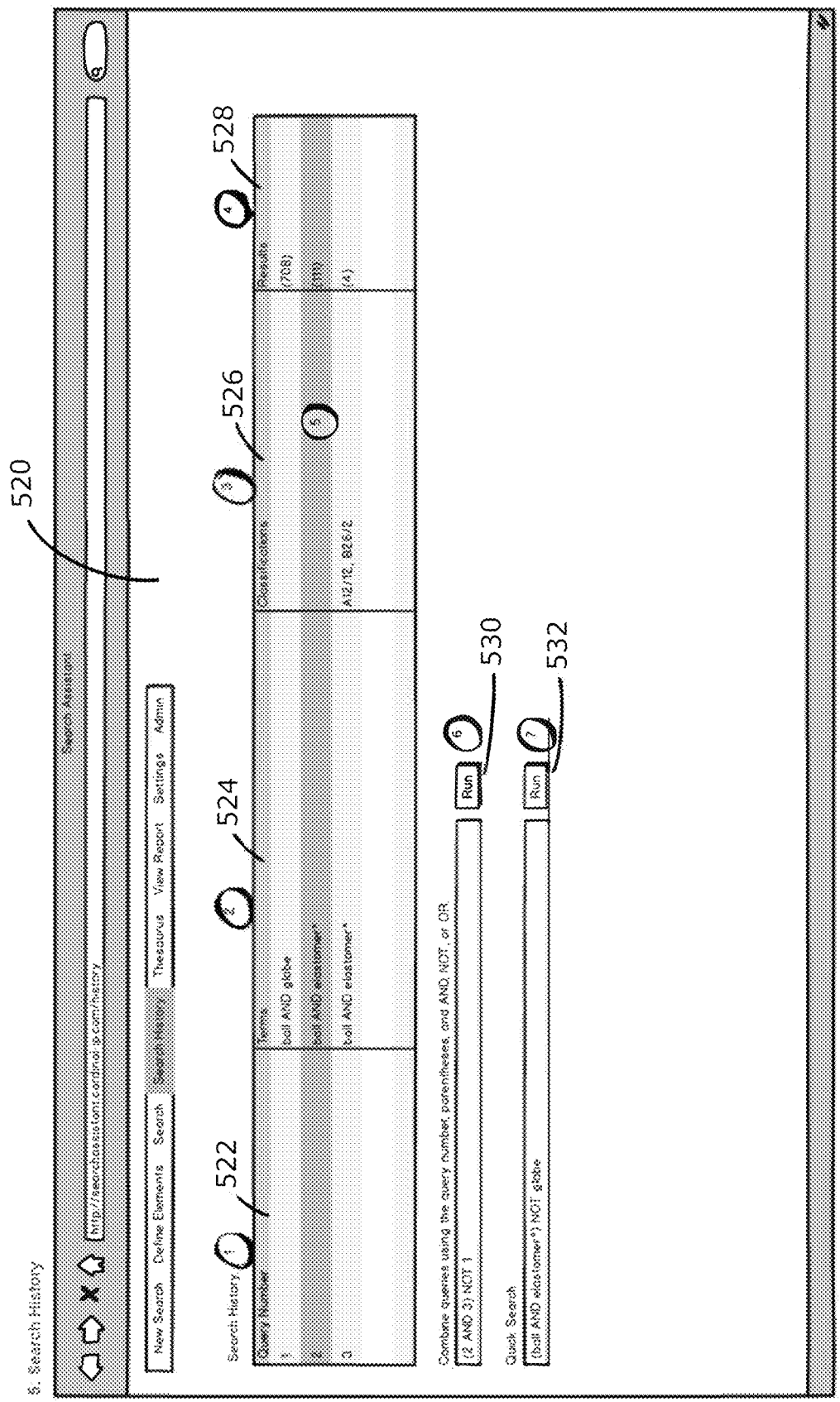

Referring to FIG. 4G, the Segment Selection screen 500 presents a text-selectable version of the PDF for highlighting of relevant segments in the document. The Segment Selection screen 500 can be generated by real-time OCR-ing.

A dropdown box 502 can be used to include the reference in a patent reference report. Selection triggers the addition to the report.

A colored button 504 can appear for each element that was selected. Clicking one of these buttons 504 activates a highlighter that can be used on the text-selectable PDF. Blocks of text can be highlighted in that color, which can add the text to the patent reference report for the correspondingly colored element.

A text-selectable PDF 506 appears here. Keywords 508 are highlighted in color as specified in the Keywords box.

The server can take a guess at a matching paragraph for each selected element and pre-highlight a selection of text. The user can then delete or add highlight sections of text to map them to the claim elements. Hovering over a block of highlighted text 510 pops up a popover 512 with the calculated line and column number 514, as well as a delete button 516 to delete the highlight block 510.

Citations can be calculated as follows for each highlighted block 510: If the paragraph number is present at the beginning of the paragraph, the paragraph number will be used as the citation. If the paragraph number is not apparent or available, but line and column numbers are available, they will be used. If then line or column numbers are not apparent or available, the page number will be used. If the page number is not apparent or available, or if the system does not determine any of the above to a reasonable accuracy as define by a preset tolerance threshold, no citation will be used and the user will be prompted to add the information manually.

Figure 4I:
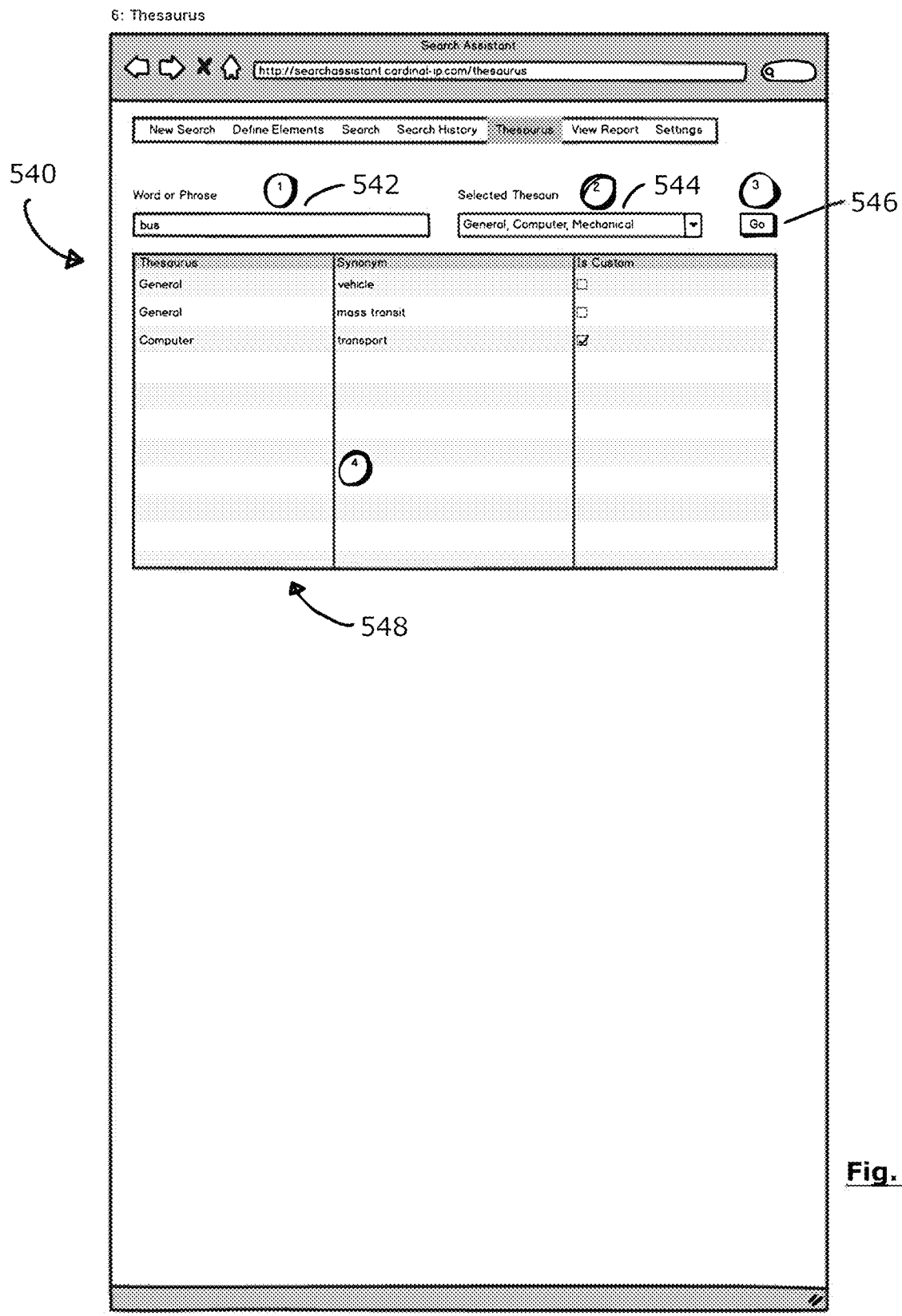

Referring to FIG. 4I1, the Search History panel 520 can pop over on the layout screens. The "Search Number" 522 is a number assigned incrementally by the system each time a new search is executed by clicking the "search" button on the "Define Search" page. No other method of searching can generate a search history line item (e.g., revisiting a previous search). The query terms 524 used in the search can appear in column 1. The classification limiters 524 used in the search can appear in column 2. The number of results the query generated 528 can appear in column 4.

Double-clicking on a particular search can take the user to the "Define Search" page with the clicked search pre-populated in the windows (query, selected elements, selected keywords, and classifications. Queries can be combined arbitrarily into combinations of AND, OR, or NOT using the query numbers, parentheses, and AND, NOT, or OR keywords. Clicking "Run" 530 opens a new "Search" window that contains the query and executed search results. Users can enter a brand-new query as a Quick Search using standard query syntax. Clicking "Run" 532 opens a new "Search" window that contains the query and executed search results.

Referring to FIG. 4I, the Thesaurus page 540 allows direct access to the thesauri available in the system. The "Word or Phrase" text box 542 accepts literal strings. The Thesauri Selection dropdown box 544 allows a user to select thesauri in which to search. The Thesauri Selection drop-down box 544 allows a user to select thesauri in which to search. The 'Go' button 546 executes the search. The Results box 548 displays matches with the source thesaurus and synonym, and if the synonym was custom-added by a user. Only exact matches can be displayed.

Figure 4J:
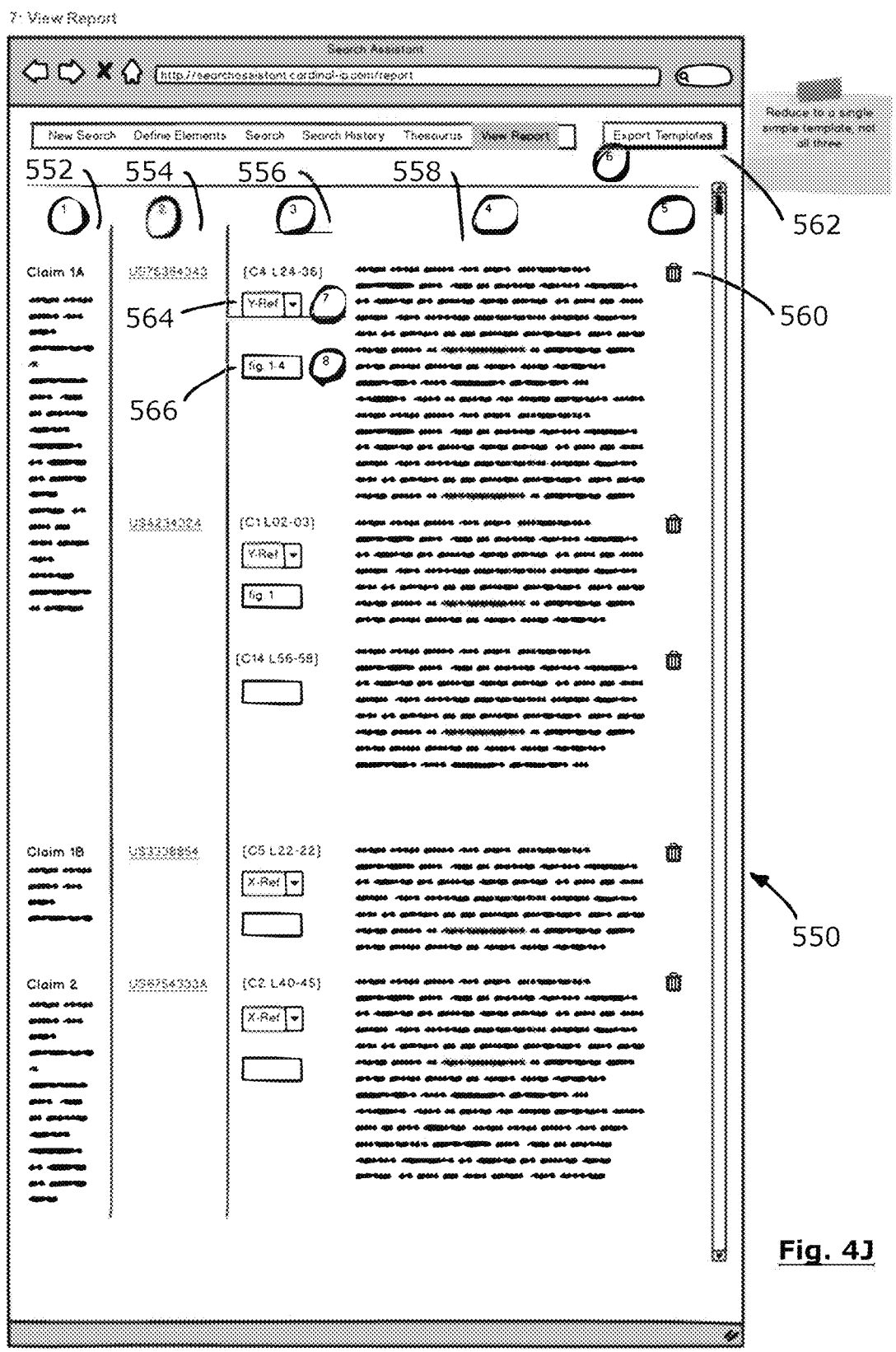

Referring to FIG. 4J, the View Report screen 550 presents search results. The Elements column 552 can contain each Claim-Element that was related to an included reference, each listed out once in order of claims and elements as determined in the import screen. The references column 554 can contain a link for each reference that referenced a claim-element. The link can open a new window to the Segment Selection page so the user can alter existing segments. The Location column 556 can contain the line and column numbers of the text that was highlighted. The Segment column 558 can contain the full text that was highlighted. The delete button 560 can pop a confirmation dialog. Upon confirmation, the full line item for the claim-element-reference selection can be deleted. The "Export Templates" button 562 can export two files: the opinion and the search history. See appendix E and F, Opinion Format and Search History Format. The selection 564 of Reference Type (X, Y, or Unspecified) can be adjusted by the user on this View Report screen 550 before the report is exported. Related figures to be included in the report can be entered in this Figures Text box 566.

Figure 4K:
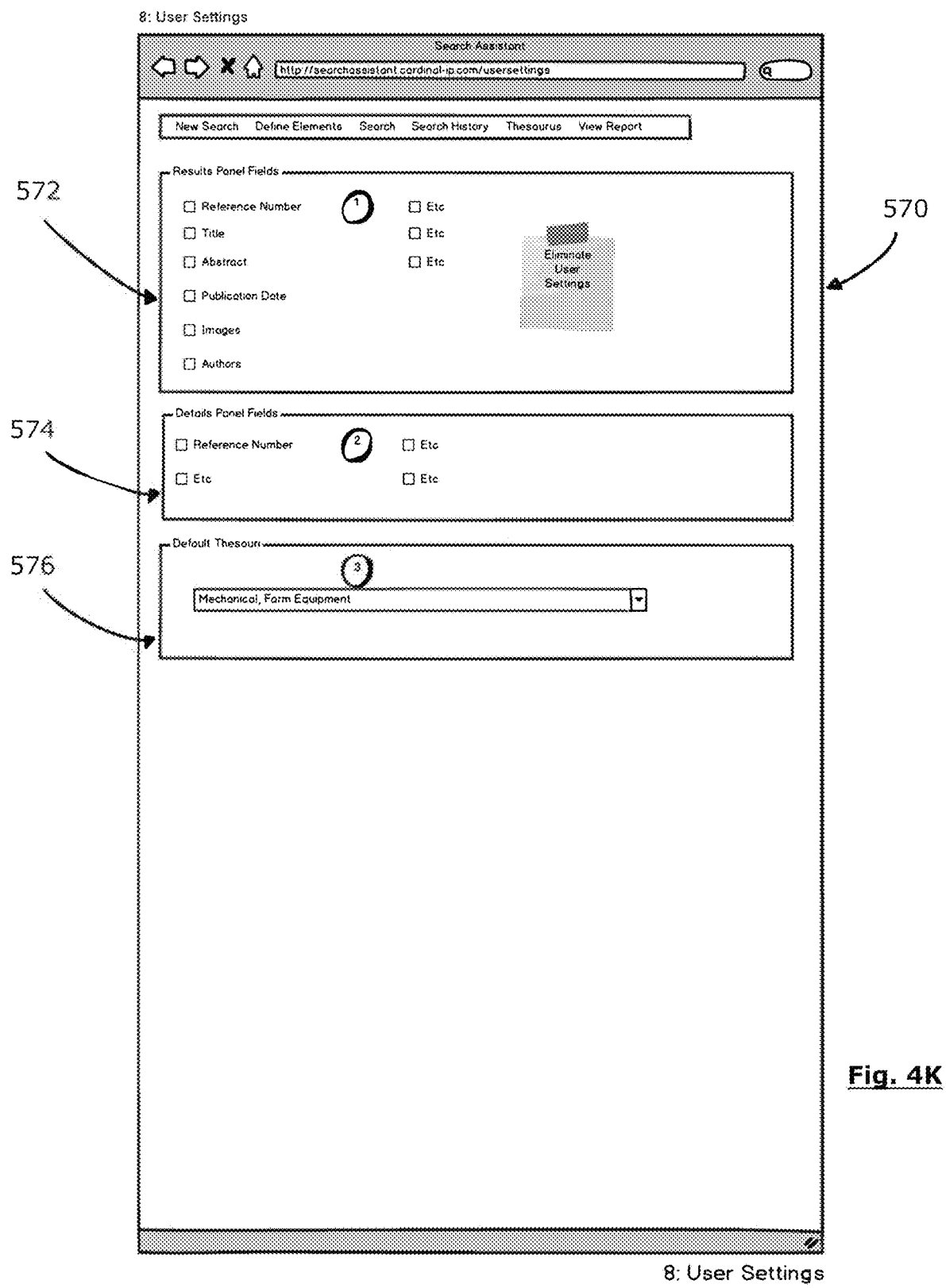

Referring to FIG. 4K, Users can adjust settings relevant to themselves on this User Settings page 570. The Results Panel Fields 572 allows selection of details to be displayed in the Results Panel for this user. The Details Panel Fields 574 allows selection of details to be that are displayed in the Details Panel for this user. The Default Thesauri 576 allows selection of thesauri that are pre-selected for this user on the Search Parameters panel when beginning a new search.

Referring to FIG. 4L, administrators can adjust system settings on the Admin page 580. The Admin page 580 appears only to users granted administration rights.

The Synonym Approval Queue 582 displays keywords that were detected as added to a query as defined in a "Query Pre-Parser". If approved, the Term-Synonym pair can be added as a one-way synonym to the Dictionary in question. If denied, the pair cannot be retained.

The Edit Thesauri 584 provides the ability to add terms to or delete terms from a given thesaurus. The dropdown box 585 can be used to select the thesaurus to edit. Synonyms are one-way (Term translates to Synonym, but not the reverse). Deleted pairs cannot be recovered.

The User Authorization 586 allows users to be granted access to the system or granted administration rights. Users are enrolled with both attributes set to 'false' by default and must be approved into the system by an administrator.

Those skilled in the art will appreciate that the elements of the methods described in association with FIGS. 1-4 can be stored as computer readable code on a non-transitory computer readable medium as desired for a particular application. As defined herein, "non-transitory computer readable medium" comprises all computer readable medium, with the sole exception being a transitory, propagating signal. The non-transitory computer readable medium can include volatile and/or non-volatile memory. Volatile memory can include memory that depends upon power to store information, e.g., various types of dynamic random access memory (DRAM), and the like. Non-volatile memory can include memory that does not depend upon power to store information, e.g., solid state media such as flash memory, EEPROM, phase change random access memory (PCRAM), and the like. Other exemplary non-transitory computer readable medium include optical discs such as digital video discs (DVD), high definition digital versatile discs (HD DVD), compact discs (CD), and laser discs; magnetic media such as magnetic tapes, tape drives, floppy discs, and magnetic hard drives; solid state media such as flash memory, memory cards, solid-state drives, USB flash drives, random access memory (RAM), static random access memory (SRAM), dynamic random access memory (DRAM), magnetic random access memory (MRAM), phase change random access memory (PCRAM), read-only memory (ROM), programmable read-only memory (PROM), erasable programmable read-only memory (EPROM), electrically erasable programmable read-only memory (EEPROM); and other types of media from which a computer, a processor or other electronic device can read.

Those skilled in the art will further appreciate that the elements of the methods described in association with FIGS. 1-4 can be expressed as signals between components of the search assistant system when information is transferred between the components as desired for a particular application. Those skilled in the art will appreciate that programming code for a step of the method initiated in one component can require complementary programming code for a step of the method completed in another component.

It is important to note that FIGS. 1-4 illustrate specific applications and embodiments of the invention, and are not intended to limit the scope of the present disclosure or claims to that which is presented therein. For example, other entities, such as a mobile device manufacturer, mobile device supplier, mobile device distributor, a third party, or the like, can take the place of the payment system operator.

Upon reading the specification and reviewing the drawings hereof, it will become immediately obvious to those skilled in the art that myriad other embodiments of the invention are possible, and that such embodiments are contemplated and fall within the scope of the presently claimed invention.

Those skilled in the art will appreciate that the elements of the methods described in association with FIGS. 1-4 can be beneficially combined as desired for a particular application. While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

EXAMPLE 1

One embodiment of a search assistant and method can be used in patent searching. A patent input searching apparatus can include one or more electronic processing devices that acquire a patent input, the patent input including at least one element; process the at least one element to select at least one element target word; process the at least one element target word to determine one or more first selected target words from an index of words; use the at least one element target word and at least one selected target word to determine select reference text; receive modification input from a user to the select reference text; and generate a report that matches citation corresponding to the modified reference text to the at least one element. The illustration below is provided with reference to US Patent Publication Number 20160242399, entitled Hybrid Spinner-Blade and Plug Fishing Lure (hereinafter Publication).

Examples of a patent input include a patent publication, issued patent, or the like. An exemplary element of the patent input would be individual claims or a claim set. Another exemplary element would be the patent abstract. In the portion of the Publication below, the element is independent claim 1.

1. A hybrid crank-bait and spinner lure apparatus comprising:
    a crank-bait lure;
    at least one treble hook;
    wherein said at least one treble hook is disposed at a bottom of said crank-bait lure;
    a lip, said lip disposed on a front of said crank-bait lure;
    an eyelet, said eyelet disposed at said front of said crank-bait lure, above said lip;
    an extension arm;
    wherein said extension arm is configured to extend up and away from said crank-bait lure;
    a support frame, said support frame in communication with said extension arm;
    a spinner blade, said spinner blade in communication with said support frame via a swivel mechanism;
    wherein said spinner blade is disposed above said crank-bait lure;

The element target word can be elements of the claim, such as the crank-bait lure, trouble hook, lip, eyelet, etc. in independent claim 1 of the Publication above. The searching apparatus can analyze the claim to identify the individual elements. The analysis can be performed by artificial intelligence trained with existing claim set/element databases. In one example, the searching apparatus can highlight the individual elements on the graphic user interface (GUI) of the user. In another example, the user can modify or weight the highlighted individual elements and setting up the search to be performed. In another example, the selection of element target words can be automatic and proceed to the next step without user input.

One or more selected target words can be determined from an index of words based on the element target word. In one example, the index of words is a thesaurus indexed by patent classification/subclassification, i.e., a word/classification database. In one example, the searching apparatus can determine the selected target words using artificial intelligence trained with existing word/classification databases. In one example, the user can flag the selected target word for higher importance in future searches when the user sees its occurrence as being unexpected and/or particularly valuable. For the Publication example, the searching apparatus could return the selected target word "fishhook" from the index of words in response to "treble hook" as the element target word.

A combination of the element target word and the selected target words can be used to determine select reference text within the patent input, e.g., the abstract or specification of the patent application. In the Publication paragraph below, the searching apparatus may determine select reference text as the following when the element target word is "treble hook" and the selected target word is "fishhook:" At least one treble hook (30) is disposed at the dorsal end of the lure (10). Additionally, at least one treble hook (30) may be disposed at the bottom, near the center of the lure (10). In one example, the searching apparatus can highlight the select reference text on the graphic user interface (GUI) of the user. in another example, the searching apparatus can display a number of portions of select reference text on the GUI of the user and the user can select the select reference text they feel to be most relevant. In one example, the user can re-select different text is the select reference text on the GUI, if for example the user identifies text that they consider more relevant. In one example, the searching apparatus can generate a report citing the select reference text. In the Publication example, the searching apparatus report can note that paragraph [0013] of US Patent Publication 20160242399 discloses at least one treble hook (30) disposed at the dorsal end of the lure (10) (see FIG. 5). In another example, the searching apparatus can generate the report automatically without displaying the select reference text on the GUI.

[0013] The present invention generally comprises a hybrid fishing lure device equipped with both a spinner blade (20) and a lure (10). The lure (10) is preferably similar in size and scope to a crank bait or plug lure. As such, the lure (10) of the present invention has a lip (80) affixed to a front portion of the lure (10) and oriented under the center horizontal axis of the lure (10). At least one treble hook (30) is disposed at the dorsal end of the lure (10). Additionally, at least one treble hook (30) may be disposed at the bottom, near the center of the lure (10). The lure (10) is preferably composed of a plastic, acrylic or similar polymer. The at least one treble hook (30) is preferably made of metal or a metallic alloy. A conventional eyelet is disposed at the front of the lure (10).

Figure 5:
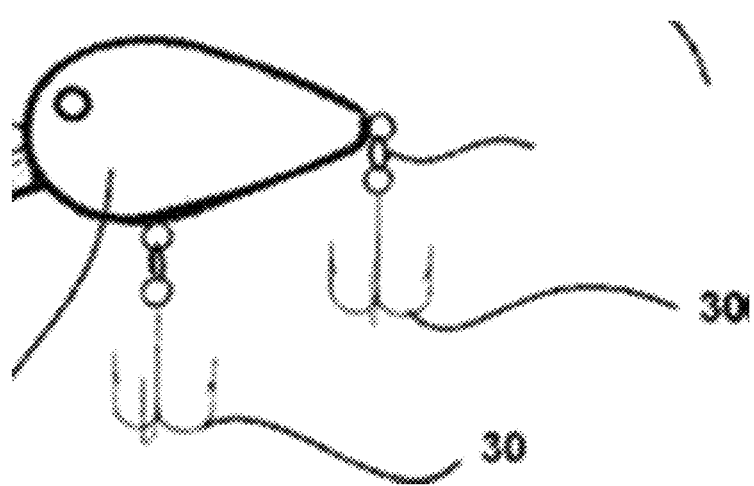
FIG. 5 shows a portion of FIG. 1 of US Patent Publication Number 20160242399.

In another embodiment, the searching apparatus can account for images within the patent input. Continuing the Publication example from above, the searching apparatus can note the proximity of element 30 and treble hook in paragraph and identify sub image below (as shown in FIG. 5) including reference number 30 as a relevant portion of the image input Figure. The searching apparatus can then use the identified sub image (see FIG. 5) to determine reference figure portions similar to the identified sub image from an index of images by patent classification. In one example, the index of figures is indexed by patent classification/subclassification, i.e., a figure/classification database. In one example, the searching apparatus can determine the reference figure portions using artificial intelligence trained with existing figure/classification databases. In one example, the user can flag particular reference figure portions for higher importance in future searches when the user sees its occurrence as being unexpected and/or particularly valuable.

The references including the select portions of reference text and select sub images can be ranked, e.g., by number of occurrences of the select portions/sub images. In one example, the searching apparatus can highlight the select reference text and select sub image on the graphic user interface (GUI) of the user. In another example, the searching apparatus can display a number of portions of select reference text and/or select sub images on the GUI of the user and the user can select the select reference text and select sub images they feel to be most relevant. In one example, the user can re-select different text is the select reference text and/or a different portion of the select sub image on the GUI, if for example the user identifies text/sub image that they consider more relevant. In one example, the searching apparatus can generate a report citing the select reference text. In the Publication example, the searching apparatus report can note that FIG. 1 and paragraph [0013] of US Patent Publication 20160242399 discloses at least one treble hook (30) disposed at the dorsal end of the lure (10) (see FIG. 5). In another example, the searching apparatus can generate the report automatically without displaying the select portions of reference text and select sub images on the GUI.

Those skilled in the art will appreciate that the elements of the methods described herein as performed by the searching apparatus can be stored as computer readable code on a non-transitory computer readable medium as desired for a particular application.

EXAMPLE 2

In one embodiment, a plurality of thesaurus indexes corresponding to patent classifications provide words and phrases associated with key words. A plurality of thesaurus indexes also corresponding to images associated with the key words and other similar images is also provided for each patent classification. The patent classification can correspond to classes and subclasses used by the USPTO and foreign patent offices. Alternatively, the patent classification can correspond to other patent subject matter groupings or categorization. Selecting the appropriate thesaurus indexes to use during both text and image searching can be based on user input of the classifications, or by a determination based on classification determined from listings on the face of a patent, or by comparing keywords of claim elements across all thesaurus indexes to determine a best fit.

In one embodiment, the entire process can be automated to run a search without user input, once a patent input is acquired. For example, if the patent input is a patent with a claim 1 independent claim stating: a support apparatus comprising: a) a rectangular support member including an opening formed adjacent each corner of the rectangular member; b) four cylindrical extended member, on of each extended member received in each opening. And a dependent claim c) further comprising a foot member attached to each of the extended members. First, each element and its key words would be identified: a) rectangular, corner openings; b) cylindrical, extended, received in opening, c) foot.

These element target words are then compared to the plurality of classified thesaurus indexes to find best fit, the specific thesaurus indexes selected are then used to determine select key words. Also, the target key words would be located in the text and corresponding figure reference numbers would be located. The portion of the figure corresponding to the numbers would be identified and searched against the image index corresponding to the patent classification image index. Any images retrieved would then determine reference numerals and corresponding key words. The reference would be ranked based on the number of corresponding elements contained in a given reference based on the target keywords and select keywords and target figure portions and select figure portions found in the reference. Therefore, for example, the first ranked reference would have the most elements based on text reference and image reference. In one embodiment, a report would be generated using this ranking by matching each element to the reference text section having the most key words defining the element, and to the citation to Figure associated with the reference figure portion.

Alternatively, user input could be requested at one or more decision points in the process. For example, the initial patent classification text thesaurus index and image thesaurus index is input by the user. The elements with associated element target key words may be edited by the user to delete or include additional keywords. These added words could be added to the patent classification index. The reference key words may also be provided to the user for review and editing. The target figure may be presented to the user for edit. The user may also input the figure reference number. The ranking of the final results of references can be presented to the user to edit the rank for presentation in a report. The user can also provide an input that adds references element images portions and reference key words to the image and text indexes.

In one embodiment, the AI database of classification word and image indexes can be trained using search report results from searches previously conducted. The column and line citations along with Figure reference for a given claim element can be added to the classification index.

In one embodiment, when searching for specified portions of a figure, the entire figure would also be searched and identified using the reference numeral or figure number to identify additional context of the portion of the figure that is found. For example, if the user selects a leg portion of a figure of a chair, a search would be conducted for the leg portion in addition to the entire chair. In one embodiment the found images can be ranked based on matching of both the portion and the full figure match first and then the portion only figures. So for the above example, if a leg portion is a match and the chair is a match that prior art reference would be prioritized over a leg portion match but the full figure was a table, and not a chair.

In one embodiment, a patent input searching apparatus includes one or more electronic processing devices that: Acquire a patent input, the patent input including at least one element; Process the at least one element to select at least one element target word; Process the at least one target word to determine one or more first selected target words from an index of words; Use the at least one element target word and at least one selected target word to determine select reference text; Receive modification input from a user to the select reference text; and Generate a report that matches citation corresponding to the modified reference text to the at least one element. The index of words can be a thesaurus indexed to a patent classification or subclassification. The apparatus can further receive user input designating a at least one word index corresponding to a patent classification.

In one embodiment, a patent input searching apparatus includes one or more electronic processing devices that: Acquire a patent input, the patent input including at least one element and at least one figure; Process the at least one element to select at least one element target word; Process the at least one target word to determine one or more first selected target words from an index of words associated with a patent classification; Use the at least one element target word and at least one selected target word to determine select reference text from an index of patent references; Receive at least one image input for the user encompassing all or a portion of the figure; Process the at least one image input to determine one or more sub images; Use the at least one image input and at least one sub image to determine one or more reference figure portions from an index of images corresponding to a patent classification; Rank the references based on the reference text and the reference images corresponding to a greatest number of elements; Receive image reference number input corresponding to the reference images; Determine second select text related the reference numbers; and Index the second select text and corresponding reference image to indexes corresponding to the patent classification. Alternatively, the patent input searching apparatus can determine from the patent description a number corresponding to key words within the element and relate that to the figure to capture the image input without the user.

EXAMPLE 3

In one embodiment, independent and dependent claims are determined from a patent input. The patent input may be an issued patent, a patent application, a set of claims, or a set of one or more elements that define a potential claim. The elements of each claim are then parsed to define target elements. In one embodiment, the target elements are further defined as independent target elements and dependent target elements.

In one embodiment, the target elements are further parsed into element key words or phrases. These element key words may then be compared to a subject area specific thesaurus. In one embodiment the subject area specific thesaurus is defined by patent classifications. And, an input of the classification to the system would initiate the comparison of the target elements to a list of associated words or phrases that correspond the element key words or phrases with the classification code specific thesaurus.

In one embodiment, and based on the comparison, plurality of key word or phrase search strings are generated. In one embodiment, the user may be presented with the generated search strings to allow editing, additions or subtractions. The search strings are then run against one or more databases.

In one embodiment, a user is presented with an interface of the patent input which includes figures. The user may then select one or more figures or portions of the figures as image search targets. In one embodiment a user may enter a patent classification input and the image search targets are compared to an indexed databased of images associated with the classification input. Images having similarity to the image search target are then presented to the user. Based on user selection input, figure numbers associated with the selected images are located in the text of the associated reference and associated key words or phrases are then added to the thesaurus along with the selected images. The AI engine is thus trained for future searching. Alternatively, the same sequence can occur without user input but rather on priority ranking. Alternatively, only final reference and images selected for a search report will be added to the target element thesaurus.

In one embodiment, the user would be provided with both the key words or phrases associated with the target elements and the images associated with the image search targets. In one embodiment the references are prioritized based on number of elements of an independent or dependent claim that are located within the reference. The user interface allows the user to expand upon the text portion. This may be done by bracket indicators or highlighting addition text. For example, if original element is shown as one keyword the user could expand to include one or more sentences or paragraphs to provide more context. Once each reference corresponding the target elements and image search targets is selected the user may initiate opinion preparation. The opinion would list each element and cite to the column and line and/or Figure and/or figure number associated with each element.

EXAMPLE 4

In one embodiment, a method of searching for publications includes: Selecting at least one figure of a target document; Selecting at least one designated portion of the selected figure; Determining at least one keyword within the selected text relating to the designated portion; Scanning a database of prior art documents for the at least one keyword along with words relating to the at least one keyword; and Providing a list of the scanned documents including the at least one keyword and words relating to the keyword.

In one embodiment, a method of searching for publications includes: Selecting at least one figure of a target document; Selecting at least one designated portion of the selected figure; Scanning a database of documents for figures including portions relating to the at least one designated portion; Providing a list of the scanned documents including the figures with related figure portions; Identifying text language relating to the related figure portions; Scanning a database of documents for the text language; and Providing a list of the scanned documents including text language.

In one embodiment, a method of searching for publications includes: Selecting at least one figure of a target document; Selecting at least one designated portion of the selected figure; Scanning a database of documents for figures including portions relating to the at least one designated portion, the related figure portions including indicators; Providing a list of the scanned documents including the figures with related figure portions along with the indicators; Identifying text language relating to the indicators; Scanning a database of documents for the text language; and Providing a list of the scanned documents including text language. In one embodiment, the method can also include adding the text language to a thesaurus associated with the database scanning and relating to the selected portion of the target document. In another embodiment, the method can also include the database scanning being initiated based on a classification approval process including whether the document is within at least one selected classification. In another embodiment, the method can also include the classification approval process including determining the classification based on the target document.

The invention claimed is:

1. A computer-implemented method of searching for patent documents in a patent database, wherein the patent database is configured using artificial intelligence analysis for at least one patent classification, the method comprising:
   receiving at least a portion of a target patent document, wherein the portion of the target patent document is machine-readable, and wherein the portion of the target patent document is processed using computer vision analysis;
   conducting a search of the patent database to identify at least one patent document in the patent database, wherein the search of the patent database is conducted based on the portion of the target patent document;
   determining at least one portion of the at least one patent document;
   determining a citation to the at least one portion of the at least one patent document, wherein the citation identifies a location of the at least one portion within the at least one patent document; and
   mapping the at least one portion of the patent document to at least one portion of the target patent document.

2. The method of claim 1, further comprising:
   receiving the target patent document; and
   determining a search query from the target patent document, wherein the search of the patent database is conducted based on the search query.

3. The method of claim 2, wherein the search query includes at least one word, keyword, term, element, text, number, patent classification, portion of a patent claim, portion of a figure, or a combination thereof.

4. The method of claim 3, further comprising identifying at least one synonym corresponding to the at least one word, keyword, term, element, text, or portion of the patent claim, wherein the search query includes the at least one synonym.

5. The method of claim 2, wherein the search query includes first and second words and a predetermined number of words between the first and second words.

6. The method of claim 1, further comprising receiving a search query, wherein the search of patent database is conducted based on the search query.

7. The method of claim 1, wherein the search of the patent database is conducted based on user input, at least a portion of the target patent document, artificial intelligence analysis, or a combination thereof.

8. The method of claim 1, further comprising ranking the at least one patent document based on search, and wherein the at least one portion of the at least one patent document is determined based on user input, art, artificial intelligence analysis, or a combination thereof.

9. The method of claim 1, wherein the citation includes a paragraph number, a column number, a line number, a page number, or a combination thereof.

10. The method of claim 1, further comprising providing the at least one portion of the at least one patent document along with the citation for display on a graphical user interface.

11. The method of claim 1, further comprising providing the at least one portion of the at least one patent document for display on a graphical user interface, wherein the at least one portion of the at least one patent document is configured to be displayed in a highlighted form.

12. The method of claim 1, wherein the patent database is further configured by conducting a computer vision analysis on the patent database, and wherein a representation of the target patent document is generated using optical character recognition (OCR).

13. The method of claim 1, wherein the patent database is generated from a forward-and-backward citation search.

14. A computer-implemented method of searching for patent documents in a patent database, wherein the patent database is configured using artificial intelligence analysis for at least one patent classification, the method comprising:
   receiving at least a portion of a target patent document, wherein the portion of the target patent document is machine-readable, and wherein the portion of the target patent document is processed using computer vision analysis;
   conducting a search of the patent database to identify at least one patent document in the patent database, wherein the search of the patent database is conducted based on the portion of the target patent document, and wherein the portion of a target patent document includes at least one term or word associated with a reference number of a figure of the target patent document;
   determining at least one portion of the at least one patent document; and
   determining a citation to the at least one portion of the at least one patent document, wherein the citation identifies a location of the at least one portion within the at least one patent document.

15. The method of claim 14, further comprising mapping the at least one portion of the at least one patent document to a portion of the figure of the target patent document.

16. The method of claim 14, wherein the search of the patent database is conducted based on user input, at least a portion of the target patent document, artificial intelligence analysis, or a combination thereof.

17. The method of claim 14, wherein the patent database is further configured by conducting a computer vision analysis on the patent database, and wherein a representation of the target patent document is generated using optical character recognition (OCR).

18. The method of claim 14, further comprising:
   identifying a reference number associated with the figure; and
   determining at least one word or term in the target patent document related to the reference number.

19. The method of claim 14, wherein the citation includes a paragraph number, a column number, a line number, or a combination thereof, and wherein the at least one portion includes text, a number, a portion of a figure, or a combination thereof.

20. The method of claim 14, further comprising providing the at least one portion of the at least one patent document along with the citation for display on a graphic user interface, wherein the at least one portion of the at least one patent document is configured to be displayed in a highlighted form.

* * * * *